(12) United States Patent
Jiang et al.

(10) Patent No.: US 10,418,664 B2
(45) Date of Patent: Sep. 17, 2019

(54) STRETCHABLE BATTERIES

(71) Applicant: ARIZONA BOARD OF REGENTS ON BEHALF OF ARIZONA STATE UNIVERSITY, Scottsdale, AZ (US)

(72) Inventors: Hanqing Jiang, Chandler, AZ (US); Zeming Song, Tempe, AZ (US); Hongyu Yu, Chandler, AZ (US); Xu Wang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 15/513,909

(22) PCT Filed: Sep. 25, 2015

(86) PCT No.: PCT/US2015/052205
§ 371 (c)(1),
(2) Date: Mar. 23, 2017

(87) PCT Pub. No.: WO2016/049444
PCT Pub. Date: Mar. 31, 2016

(65) Prior Publication Data
US 2017/0250447 A1 Aug. 31, 2017

Related U.S. Application Data

(60) Provisional application No. 62/056,187, filed on Sep. 26, 2014.

(51) Int. Cl.
*H01M 10/0525* (2010.01)
*H01M 10/0585* (2010.01)
(Continued)

(52) U.S. Cl.
CPC ..... *H01M 10/0585* (2013.01); *H01M 2/0202* (2013.01); *H01M 2/0207* (2013.01);
(Continued)

(58) Field of Classification Search
CPC ................. H01M 10/052; H01M 10/0525
See application file for complete search history.

(56) References Cited

U.S. PATENT DOCUMENTS 4,922,059 A 5/1990 Walker et al.
5,008,496 A 4/1991 Schmidt et al.
(Continued)

FOREIGN PATENT DOCUMENTS

CN 1610168 4/2005
WO WO 2001094253 12/2001
(Continued)

OTHER PUBLICATIONS

Song et al., "Origami 1 ithiwn-ion batteries," brochure, Nature Communications, Jan. 8, 2014, vol. 5, article No. 3140, pp. 1-6 see pp. 2-3; Methods in p. 6; figure 1.
(Continued)

*Primary Examiner* — Olatunji A Godo
(74) *Attorney, Agent, or Firm* — Michael Best & Friedrich LLP

(57) ABSTRACT

The invention is directed to a flexible and stretchable battery which is formed of an assembly having anode side and a cathode side separated by a separator and sealed in a packaging. The assembly is in a folded configuration and contains at least one cut therein, such that when the assembly is unfolded and subjected to subsequent deformation, a final folded state of the battery is able to stretch beyond a flat planar state of the battery in all dimensions.

20 Claims, 25 Drawing Sheets

(51) Int. Cl.

| | | |
|---|---|---|
| *H01M 10/0583* | (2010.01) | |
| *H01M 2/02* | (2006.01) | |
| *H01M 4/66* | (2006.01) | |
| *H01M 10/04* | (2006.01) | |
| *H01M 10/058* | (2010.01) | |
| *H01M 4/131* | (2010.01) | |
| *H01M 4/133* | (2010.01) | |
| *H01M 4/525* | (2010.01) | |
| *H01M 4/587* | (2010.01) | |
| *H01M 4/13* | (2010.01) | |
| *H01M 2/16* | (2006.01) | |

(52) U.S. Cl.
CPC ......... *H01M 2/029* (2013.01); *H01M 2/0275* (2013.01); *H01M 2/0277* (2013.01); *H01M 4/131* (2013.01); *H01M 4/133* (2013.01); *H01M 4/525* (2013.01); *H01M 4/587* (2013.01); *H01M 4/667* (2013.01); *H01M 10/045* (2013.01); *H01M 10/0436* (2013.01); *H01M 10/058* (2013.01); *H01M 10/0525* (2013.01); *H01M 10/0583* (2013.01); *H01M 2/1653* (2013.01); *H01M 4/13* (2013.01); *H01M 4/661* (2013.01); *H01M 4/663* (2013.01); *H01M 2002/0205* (2013.01); *H01M 2220/30* (2013.01)

(56) References Cited

U.S. PATENT DOCUMENTS

| | | |
|---|---|---|
| 5,115,344 A | 5/1992 | Jaskie |
| 5,121,297 A | 6/1992 | Haas |
| 5,168,384 A | 12/1992 | Genba |
| 5,519,596 A | 5/1996 | Woolverton |
| 5,648,771 A | 7/1997 | Halgren et al. |
| 5,903,440 A | 5/1999 | Blazier et al. |
| 5,969,783 A | 10/1999 | Takiar et al. |
| 6,050,962 A | 4/2000 | Kramer et al. |
| 6,299,337 B1 | 10/2001 | Bachl et al. |
| 6,384,890 B1 | 5/2002 | Takiar et al. |
| 6,455,931 B1 | 9/2002 | Hamilton, Jr. et al. |
| 6,461,762 B1* | 10/2002 | Yang ............... H01M 10/0431 429/127 |
| 6,476,733 B1 | 11/2002 | Amiri |
| 6,482,540 B1 | 11/2002 | Gozdz et al. |
| 6,584,857 B1 | 7/2003 | Furlani et al. |
| 6,695,457 B2 | 2/2004 | van Drieenhuizen et al. |
| 6,880,955 B2 | 4/2005 | Lin |
| 6,936,855 B1 | 8/2005 | Harrah |
| 7,201,511 B2 | 4/2007 | Moriyama et al. |
| 7,215,547 B2 | 5/2007 | Chang et al. |
| 7,265,719 B1 | 9/2007 | Moosbrugger et al. |
| 7,513,664 B2 | 4/2009 | Chou |
| 8,080,736 B2 | 12/2011 | DeNatale et al. |
| 8,658,904 B2 | 2/2014 | Naganuma et al. |
| 9,706,646 B2 | 7/2017 | Jiang et al. |
| 2002/0094701 A1 | 7/2002 | Biegelsen et al. |
| 2003/0091896 A1* | 5/2003 | Watanabe ............ H01M 2/1077 429/158 |
| 2003/0122476 A1 | 7/2003 | Wang et al. |
| 2003/0129488 A1* | 7/2003 | Gross ................ H01M 2/0275 429/185 |
| 2004/0118595 A1 | 6/2004 | Flammer et al. |
| 2004/0119442 A1* | 6/2004 | Lee .................... H02J 7/0042 320/112 |
| 2004/0172820 A1 | 9/2004 | Lopez |
| 2005/0099361 A1 | 5/2005 | Majer |
| 2005/0110702 A1 | 5/2005 | Aoki et al. |
| 2005/0280157 A1 | 12/2005 | Roush et al. |
| 2006/0063351 A1 | 3/2006 | Jain |
| 2006/0073383 A1* | 4/2006 | Han ................ H01M 10/4257 429/176 |
| 2006/0082298 A1 | 4/2006 | Becken et al. |
| 2006/0113279 A1 | 6/2006 | Little |
| 2007/0090457 A1 | 4/2007 | Lee et al. |
| 2007/0166845 A1 | 7/2007 | Yokokawa |
| 2007/0270315 A1 | 11/2007 | Saruwatari et al. |
| 2008/0093110 A1 | 4/2008 | Bagung |
| 2008/0093118 A1 | 4/2008 | Takahashi et al. |
| 2008/0101070 A1 | 5/2008 | Chou |
| 2008/0125510 A1 | 5/2008 | Crosby et al. |
| 2008/0158498 A1 | 7/2008 | Chang et al. |
| 2008/0179079 A1 | 7/2008 | Ishii et al. |
| 2008/0289859 A1 | 11/2008 | Mikado et al. |
| 2009/0009046 A1 | 1/2009 | Oh et al. |
| 2009/0103295 A1 | 4/2009 | Wang |
| 2009/0167171 A1 | 7/2009 | Jung et al. |
| 2009/0207560 A1 | 8/2009 | Lee |
| 2009/0283891 A1 | 11/2009 | Dekker et al. |
| 2009/0297776 A1 | 12/2009 | Crosby et al. |
| 2009/0310209 A1 | 12/2009 | Aschwanden et al. |
| 2009/0310221 A1 | 12/2009 | Aschwanden |
| 2010/0011529 A1 | 1/2010 | Won et al. |
| 2010/0053207 A1 | 3/2010 | Cohen et al. |
| 2010/0143677 A1 | 6/2010 | Lee et al. |
| 2010/0149640 A1 | 6/2010 | Paek et al. |
| 2010/0307705 A1 | 12/2010 | Rahm et al. |
| 2011/0096545 A1 | 4/2011 | Chang |
| 2011/0227822 A1 | 9/2011 | Shai |
| 2011/0228536 A1 | 9/2011 | Im et al. |
| 2012/0143525 A1 | 6/2012 | Chen et al. |
| 2012/0146050 A1 | 6/2012 | Adan et al. |
| 2012/0168009 A1 | 7/2012 | Chen et al. |
| 2012/0170244 A1 | 7/2012 | Kwon et al. |
| 2012/0202101 A1 | 8/2012 | Ueda |
| 2012/0212820 A1 | 8/2012 | Jiang et al. |
| 2012/0292504 A1 | 11/2012 | Nojima |
| 2013/0171490 A1* | 7/2013 | Rothkopf ............ H01M 2/0207 429/120 |
| 2014/0204300 A1 | 7/2014 | Park et al. |
| 2015/0342050 A1 | 11/2015 | Jiang et al. |
| 2016/0313478 A1 | 10/2016 | Lee et al. |

FOREIGN PATENT DOCUMENTS

| | | |
|---|---|---|
| WO | WO 03-021679 | 3/2003 |
| WO | 2014/029908 | 2/2014 |
| WO | WO 2014113489 | 7/2014 |

OTHER PUBLICATIONS

Xu et al., "Stretchable batteries with self-similar serpentine interconn. ects and integrated wireless recharging systems", Nature Communications, Feb. 26, 2013, vol. 4, article No. 1543, pp. 1-8 see abstract; pp. 2-4; Methods in p. 7; figures 1-3.
PCT/US2015/052205 International Search Report and Written Opinion of the International Searching Authority dated Dec. 23, 2015 (9 pages).
Hu, L.; Cui, H. Energy Environ. Sci. 2012, 6423-6435.
Huang, J.; Zhu, H.; Chen, Y.; Preston, C.; Rohrbach, K.; Cumings, J.; Hu, L. ACS Nano 2013, 2106-2113.
Dragoman, M.; Flahaut, E.; Dragoman, D.; Al Ahmad, M.; Plana, R. Nanotechnology 2009, 375203.
Liu, H.; Crooks, R. M. Anal. Chem. 2012, 2528-2532.
Lankelma, J.; Nie, Z.; Carrilho, E.; Whitesides, G. M. Anal. Chem. 2012, 4147-4152.
Liu, H.; Crooks, R. M. J. Am. Chem. Soc. 2011, 17564-17566.
Dungchai, W.; Chailapakul, O.; Henry, C. S. Anal. Chem. 2009, 5821-5826.
Martinez, A. W.; Phillips, S. T.; Whitesides, G. M.; Carrilho, E. Anal. Chem. 2010, 3-10.
Siegel, A. C.; Phillips, S. T.; Wiley, B. J.; Whitesides, G. M. Lab Chip 2009, 2775-2781.
Hu, L.; Zheng, G.; Yao, J.; Liu, N.; Weil, B.; Eskilsson, M.; Karabulut, E.; Ruan, Z.; Fan, S.; Bloking, J. T.; McGehee, M. D.; Wagberg, L.; Cui, Y. Energy Environ. Sci. 2013, 513-518.
Russo, A.; Ahn, B. Y.; Adams, J. J.; Duoss, E. B.; Bernhard, J. T.; Lewis, J. A. Adv. Mater. 2011, 3426-3430.

(56) References Cited

OTHER PUBLICATIONS

Yuan, L.; Yao, B.; Hu, B.; Huo, K.; Chen, W.; Zhou, J. Energy Environ. Sci. 2013, 470-476.
Olsson, H.; Carlsson, D. O.; Nystrom, G.; Sjodin, M.; Nyholm, L.; Stromme, M. J. Mater. Sci. 2012, 5317-5325.
Razaq, A.; Nyholm, L.; Sjödin, M.; Strømme, M.; Mihranyan, A. Adv. Energy Mater. 2012, 445-454.
Jabbour, L.; Destro, M.; Chaussy, D.; Gerbaldi, C.; Penazzi, N.; Bodardo, S.; Beneventi, D. Cellulose 2013, 571-582.
Chun, S. J.; Choi, E. S.; Lee, E. H.; Kim, J. H.; Lee, S. Y.; Lee, S. Y. J. Mater. Chem. 2012, 16618-16626.
Xu, S.; Zhang, Y.; Cho, J.; Lee, J.; Huang, X.; Jia, L.; Fan, J. A.; Su, Y.; Su, J.; Zhang, H.; Cheng, H.; Lu, B.; Yu, C.; Chuang, C.; Kim, T. I.; Song, T.; Shigeta, K.; Kang, S.; Dagdeviren, C.; Petrov, I.; Braun, P. V.; Huang, Y.; Paik, U.; Rogers, R. A. Nat. Commun. 2013, 1543.
Jost, K.; Perez, C. R.; McDonough, J. K.; Presser, V.; Heon, M.; Dion, G.; Gogotsi, Y. Energy Environ. Sci. 2011, 5060-5067.
Sun, C.; Zhu, H.; Baker, E. B., III; Okada, M.; Wan, J.; Ghemes, A.; Inoue, Y.; Hu, L.; Wang, Y. Nano Energy 2013, DOI: 10.1016/j.nanoen.2013.03.020.
Liu, Y.; Gorgutsa, S.; Santato, C.; Skorobogatiy, M. J. Electrochem. Soc. 2012, A349-A356.
Hu, L.; Choi, J. W.; Yang, Y.; Jeong, S.; La Mantia, F.; Cui, L. F.; Cui, Y. Proc. Natl. Acad. Sci. U.S.A. 2009, 21490.
Hu, L.; Wu, H.; La Mantia, F.; Yang, Y.; Cui, Y. ACS Nano 2011, 5843-5848.
Gui, Z.; Zhu, H.; Gillette, E.; Han, X.; Rubloff, G. W.; Hu, L.; Lee, S. B. ACS Nano 2013, 6037-6046.
Kang, Y. J.; Chun, S. J.; Lee, S. S.; Kim, B. Y.; Kim, J. H.; Chung, H.; Lee, S. Y.; Kim, W. ACS Nano 2012, 6400-6406.
Kang, Y. R.; Li, Y. L.; Hou, F.; Wen, Y. Y.; Su, D. Nanoscale 2012, 3248-3253.
Weng, Z.; Su, Y.; Wang, D. W.; Li, F.; Du, J.; Cheng, H. M. Adv. Energy Mater. 2011, 917-922.
Zheng, G.; Hu, L.; Wu, H.; Xie, X.; Cui, Y. Energy Environ. Sci. 2011, 3368-3373.
Chen, P.; Chen, H.; Qiu, J.; Zhou, C. Nano Res. 2010, 594-603.
Zhong, Q.; Zhong, J.; Hu, B.; Hu, Q.; Zhou, J.; Wang, Z. L. Energy Environ. Sci. 2013, 1779-1784.
Fan, K.; Peng, T.; Chen, J.; Zhang, X.; Li, R. J. Mater. Chem. 2012, 16121-16126.
Zhang, L.; Zhou, M.; Wen, D.; Bai, L.; Lou, B.; Dong, S. Biosens. Bioelectron. 2012, 155-159.
Xie, X.; Pasta, M.; Hu, L.; Yang, Y.; McDonough, Y.; Cha, J.; Criddle, C. S.; Cui, Y. Energy Environ. Sci. 2011, 1293-1297.
Gardner, J. P.; Mather, J. C.; Clampin, M.; Doyon, R.; Greenhouse, M. A.; Hammel, H. B.; Hutchings, J. B.; Jakobsen, P.; Lilly, S. J.; Long, K. S.; Lunine, J. I.; McCaughrean, M. J.; Mountain, M.; Nella, J.; Rieke, G. H.; Rieke, M. J.; Rix, H. W.; Smith, E. P.; Sonneborn, G.; Stiavelli, M.; Stockman, H. S.; Windhorst, R. A.; Wright, G. S. Space Sci. Rev. 2006, 485-606.
Ahn, B. Y.; Shoji, D.; Hansen, C. J.; Hong, E.; Dunand, D. C.; Lewis, J. A. Adv. Mater. 2010, 2251-2254.
Wei, Z. Y.; Guo, Z. V.; Dudte, L.; Liang, H. Y.; Mahdevan, L. Phys. Rev. Lett. 2013, 215501.
Schenk, M.; Guest, S. D. Proc. Natl. Acad. Sci. U.S.A. 2013, 3276.
An, B.; Benbernou, N.; Demaine, E. D.; Rus, D. Robotica 2011, 87-102. Nano Letters Letter 4973 dx.doi.org/10.1021/nl4030374 | Nano Lett. 2013, 13, 4969-4974.
Wang, C.; Nosaka, T.; Yost, B.; Zimmerman, B.; Sutton, E. D.; Kincaid, E.; Keberle, K.; Iqbal, Q. A.; Mendez, R.; Markowitz, S.; Liu, P.; Alford, T. L.; Chan, C. K.; Chan, K. S.; O'Connell, M. J. Mater. Res. Lett. 2013, 13-18.
Hawkes, E.; An, B.; Benbernou, N. M.; Tanaka, H.; Kim, S.; Demaine, E. D.; Rus, D.; Wood, R. J. Proc. Natl. Acad. Sci. U.S.A. 2010, 12441-12445.
Onal, C. D.; Wood, R. J.; Rus, D. IEEE Int. Conf. Rob. Autom. 2011, 4608-4613.

Paik, J. K. IEEE/RSJ Int. Conf. Intell. Robots Syst. 2011, 414-420.
Miura, K. Map fold a la miura style, its physical characteristics and application to the space science. In Research of Pattern Formation; Takaki, R Ed.; KTK Scientific Publishers: Tokyo, 1994; pp. 77-90.
Nishiyama, Y. Int. J. Pure Appl. Math 2012, 269-279.
Miura, K. Method of packaging and deployment of large membranes in space; Technical Report for the Institute of Space and Astronautical Science. Report No. 618, Dec. 1985.
Gaynor, J. F.; Senkevich, J. J.; Desu, S. B. J. Mater. Res. 1996, 1842-1850.
John, J.; Li, Y.; Zhang, J.; Loeb, J. A.; Xu, Y. J. Micromech. Microeng. 2011, 105011.
Kim, E.; Tu, H.; Lv, C.; Jiang, H.; Yu, H.; Xu, Y. Appl. Phys. Lett. 2013, 033506.
Katragadda, R. B.; Xu, Y. Sens. Actuators, A 2008, 169-174.
Lunnon, W. F. Math. Comp. 1968, 192-199.
Demaine, E. D.; O'Rourke, J. A survey of folding and unfolding in computational geometry. In Combinatorial and computational geometry; Goodman, J. E., Pach, J., Welzl, E., Eds.; Mathematical Sciences Research Institute Publications: Cambridge University Press: New York, 2005; pp. 167-211.
Balkcom, D. J.; Mason, M. T. Int. J. Robot. Res. 2008, 613-627.
Song, Z. et al. 'Origami Lithium-ion batteries'. Nature Communications. Jan. 28, 2014. vol. 5. Article No. 3140.
Long, J. W. et al. 'Three-dimensional battery architectures'. Chemical Reviews. 2004. vol. 104. No. 10. pp. 4463-4492.
Cheng, Q. et al. 'Folding paper-based lithium batteries for higher areal energy densities'. Nano Letters. Sep. 23, 2013. vol. No. 10. pp. 4969-4974.
Chen Y, Au J, Kazlas P, Ritenour A, Gates H, McCreary M. Flexible active-matrix electronic ink display. Nature 423, 136-136 (2003).
Gelinck GH, et al. Flexible active-matrix displays and shift registers based on solution-processed organic transistors. Nat Mater 3, 106-110 (2004).
Kim S, et al. Low-Power Flexible Organic Light-Emitting Diode Display Device. Adv Mater 23, 3511-+ (2011).
Yoon B, Ham DY, Yarimaga O, An H, Lee CW, Kim JM. Inkjet Printing of Conjugated Polymer Precursors on Paper Substrates for Colorimetric Sensing and Flexible Electrothermochromic Display. Adv Mater 23, 5492-+ (2011).
Kim DH, et al. Stretchable and foldable silicon integrated circuits. Science 320, 507-511 (2008).
Ko HC, et al. A hemispherical electronic eye camera based on compressible silicon optoelectronics. Nature 454, 748-753 (2008).
Kim DH, et al. Epidermal Electronics. Science 333, 838-843 (2011).
Pushparaj VL, et al. Flexible energy storage devices based on nanocomposite paper. Proc Natl Acad Sci U S A 104, 13574-13577 (2007).
Scrosati B. Nanomaterials—Paper powers battery breakthrough. Nat Nanotechnol 2, 598-599 (2007).
Gao KZ, et al. Paper-based transparent flexible thin film supercapacitors. Nanoscale 5, 5307-5311 (2013).
Wang JZ, et al. Highly flexible and bendable free-standing thin film polymer for battery application. Mater Lett 63, 2352-2354 (2009).
Hu LB, Wu H, La Mantia F, Yang YA, Cui Y. Thin, Flexible Secondary Li-Ion Paper Batteries. ACS Nano 4, 5843-5848 (2010).
Ihlefeld JF, Clem PG, Doyle BL, Kotula PG, Fenton KR, Apblett CA. Fast Lithium-Ion Conducting Thin-Film Electrolytes Integrated Directly on Flexible Substrates for High-Power Solid-State Batteries. Adv Mater 23, 5663-+(2011).
Koo M, et al. Bendable Inorganic Thin-Film Battery for Fully Flexible Electronic Systems. Nano Lett 12, 4810-4816 (2012).
Yu CJ, Masarapu C, Rong JP, Wei BQ, Jiang HQ. Stretchable Supercapacitors Based on Buckled Single-Walled Carbon Nanotube Macrofilms. Advanced Materials 21, 4793-+(2009).
Li X, Gu TL, Wei BQ. Dynamic and Galvanic Stability of Stretchable Supercapacitors. Nano Lett 12, 6366-6371.
Hu LB, et al. Stretchable, Porous, and Conductive Energy Textiles. Nano Lett 10, 708-714 (2010).
Kuribayashi K, et al. Self-deployable origami stent grafts as a biomedical application of Ni-rich TiNi shape memory alloy foil. Mater Sci Eng A-Struct Mater Prop Microstruct Process 419, 131-137 (2006).

(56) References Cited

OTHER PUBLICATIONS

Belcastro S-M, Hull TC. Modeling the folding of paper into three dimensions using affine transformations. Linear Algebra and its Applications 348, 273-282 (2002).

PCT/US2014/072354 International Search Report and Written Opinion of the International Searching Authority dated Apr. 13, 2015 (15 pages).

PCT/US2014/011710 International Search Report and Written Opinion of the International Searching Authority dated May 12, 2014 (7 pages).

PCT/US2015/059006 International Search Report and Written Opinion of the International Searching Authority dated Feb. 17, 2016 (7 pages).

Sant et al., "An in situ heater for a phase-change-material-based actuation system," J. Micromech. Microeng. 2. 085-39 (2010).

Yang et al., "A latchable microvalve using phase change of paraffin wax," Sensors and Actuators A 134, pp. 194-200 (2007).

Äyräs P. et al., "Diffraction Gratings in Sol-gel Films by Direct Contact Printing Using a UV-mercury Lamp" 162 Opt. Comms. 215-218 (1999).

Fang Y. et al., "Resonant Waveguild Grating Biosensor for Living Cell Sensing" 91 Biophys. J. 1925-940 (2006).

Gudeman CS. et al., "Using the Grating Lite Valve Device as a Multichannel Variable Optical Attenuator (VOA) for the 1.55—µm Spectral Region" 4653 Proc. SPIE 56-61 (2002).

Albert K. Harris et al., "Silicone Rubber Substrata: A New Wrinkle in the Study of Cell Locomotion" 208 Science 177-179 (1980).

Huang R., "Kinetic Wrinkling of an Elastic Film on a Viscoelastic Substrate" 53 J. Mech. Phys. Solids 63-89 (2005).

Z. Y. Huang et al., "Nonlinear Analyses of Wrinkles in a Film Bonded to a Compliant Substrate" 53 J. Mech. Phys. Solids 2101-118 (2005).

Wilhelm T. S. Huck et al., "Ordering of Spontaneously Formed Buckles on Planar Surfaces" 16 Langmuir 3497-501 (2000).

Hanqing Jiang et al., "Finite Width Effect of Thin-films Buckling on Compliant substrate: Experimental and Theoretical Studies" 56 J. Mech. Phys. Solids 2585-598 (2008).

Cunjiang Yu et al., "Thermoresponsiveness of Integrated Ultra-Thin Silicon with Poly(N-isopropylacrylamide) Hydrogels" 32 Macromol. Rapid Commun. 820 (2011).

Cunjiang Yu et al., "Silicon Thin Films as Anodes for High-Performance Lithium-Ion batteries with Effective Stress Relaxation" 2 Adv. Energy Mater. 68 (2012).

David C. Duffy et al., "Rapid Prototyping of Microfluidic Systems in Poly(dimethylsiloxane)" 70 Anal. Chem. 4974 (1998).

Daniel H. Raguin and G. Michael Morris, "Antireflection Structured Surfaces for the Infrared Spectral Region" 32 Appl. Opt. 1154-167 (1993).

Christopher M. Stafford et al., "A Buckling-based Metrology for Measuring the Elastic Moduli of Polymetric Thin Films" 3 Nat. Mater. 545-550 (2004).

Chee Wei Wong et al., "Analog Tunable Gratings Driven by Thin-film Piezoelectric Microelectromechanical Actuators" 42 Appl. Opt. 621-626 (2003).

A. Azzam Yasseen et al., "Diffraction Grating Scanners Using Polysilicon Micromotors" 5 IEEE J. Sel. Top. Quantum Electron. 75-82 (1999).

M. Ouyang et al., "Conversion of Some Siloxane Polymers to Silicon Oxide by UV/Ozone Photochemical Processes" 12 Chem. Mater. 1591 (2000).

E. Cerda et al., "Thin Films: Wrinkling of an Elastic Sheet Under Tension" 419 Nature 579 (2002).

Christopher Harrison et al., "Sinusoidal Phase Grating Created by a Tunably Buckled Surface" 85 Appl. Phys. Lett. 4016-4018 (2004).

Ned Bowden et al., "Spontaneous Formation of Ordered Structures in Thin Films of Metals Supported on an Elastomeric Polymer" 393 Nature 146-149 (1998).

Takuya Ohzono and Masatsugu Shimomura, "Geometry-dependent Stripe Rearrangement Processes Induced by Strain on Preordered Microwrinkle Patterns" 21 Langmuir 7230-7237 (2005).

Kevin Chen et al., "Facile Large-area Photolithography of Periodic Sub-micron Structures Using a Self-formed Polymer Mask" 100 App. Phys. Lett 233503 (2012).

F.S. Chen et al., "Holographic Storage in Lithium Niobate" 13 Appl. Phys. Lett. 223 (1968).

Kahp Y. Suh et al., "A Simple Soft Lithographic Route to Fabrication of Poly(ethylene glycol) Microstructures for Protein and Cell Patterning" 25 Biomaterials 557 (2004).

Anne Horn et al., "Ordering and Printing Virus Arrays: A straightforward Way to Functionalize Surfaces" 6 Small 2122 (2010).

Jonathan G C Veinot et al., "Fabrication and Properties of Organic Light-Emitting "Nanodiode" Arrays" 2 Nano Lett. 333 (2002).

Yoshihiro Koide et al., "Hot Microcontact Printing for Patterning ITO Surfaces. Methodology, Morphology, Microstructure, and OLED Charge Injection Barrier Imaging" 19 Langmuir 86 (2003).

Cunjiang Yu et al., "Tunable Optical Gratings Based on Buckled Nanoscale Thin Films on Transparent Elastomeric Substrates" 96 Appl. Phys. Lett. 041111 (2010).

Zhiyong Fan et al., "Three-dimensional Nanopillar-array Photovoltaics on Low-cost and Flexible Substrates" 8 Nat. Mat. 648 (2009).

C. Vieu et al., "electron Beam Lithography: Resolution Limits and Applications" 164 Appl. Surf. Sci. 111 (2000).

Burn Jeng Lin, "Deep UV Lithography" 12 J. Vac. Sci. Technol. 1317 (1975).

Leon A. Woldering et al., "Periodic Arrays of Deep Nanopores Made in Silicon with Reactive Ion Etching and Deep UV Lithography" 19 Nanotechnology 145304 (2008).

Dong Sik Kim et al., "Laser-Interference Lithography Tailored for Highly Symmetrically Arranged ZnO Nanowire Arrays" 3 Small 76 (2007).

Johannes de Boor et al., "Three-beam Interference Lithography: Upgrading a Lloyd's Interferometer for Single-exposure Hexagonal Patterning" 34 Opt. Lett. 1783 (2009).

Ampere A Tseng et al., "Nanofabrication by Scanning Probe Microscope Lithography: A Review" 23 J. Vac. Sci. Technol. B 877 (2005).

Younan Xia et al., "Unconventional Methods for Fabricating and Patterning Nanostructures" 99 Chem. Rev. 1823 (1999).

L. Jay Guo, "Nanoimprint Lithography: Methods and Material Requirements" 19 Adv. Mater. 495 (2007).

Helmut Schift, "Nanoimprint Lithography: An Old Story in Modern Times? A Review" 26 J. Vac. Sci. Technol. B 458 (2008).

J. Y. Cheng et al., "Fabrication of Nanostructures with Long-range Order Using Block Copolymer Lithography" 81 Appl. Phys. Lett. 3657 (2002).

Tae-Woo Lee et al., "Soft-Contact Optical Lithography Using Transparent Elastomeric Stamps: Application to Nanopatterned Organic Light-Emitting Devices" 15 Adv. Funct. Mater. 1435 (2005).

John A. Rogers et al., "Using an Elastomeric Phase Mask for Sub-100nm Photolithography in the Optical Near Field" 70 Appl. Phys. Lett. 2658 (1997).

Dong Qin et al., "Photolithography with Transparent Reflective Photomasks" 16 J. Vac. Sci. Technol. B 98 (1998).

Zhi-Yuan Li et al., "Optimization of Elastomeric Phase Masks for Near-field Photolithography" 78 Appl. Phys. Lett. 2431 (2001).

John A. Rogers et al., "Generating—90 Nanometer Features Using Near-field Contact-mode Photolithography with an Elastomeric Phase Mask" 16 J. Vac. Sci. Technol. B 59 (1998).

Daniel J. Shir et al., "Three-Dimensional Nanofabrication with Elastomeric Phase Masks" 111 J. Phys. Chem. B 12945 (2007).

Alexandra Schweikart and Andreas Fery, "Controlled Wrinkling as a Novel Method for the Fabrication of Patterned Surfaces" 165 Microchim. Acta 249 (2009).

Won Mook Choi et al., "Biaxially Stretchable "Wavy" Silicon Nanomembranes" 7 Nano Lett. 1655 (2007).

Kirill Efimenko et al., "Nested Self-similar Wrinkling Patterns in Skins" 4 Nat. Mater. 293 (2005).

Byung-Ho Jo et al., "Three-Dimensional Micro-Channel Fabrication in Polydimethylsiloxane (PDMS) Elastomer" 9 J. Microelectromech. Syst. 76 (2000).

(56) References Cited

OTHER PUBLICATIONS

Conghua Lu et al., "A Lithography-free Method for Directed Colloidal Crystal Assembly Based on Wrinkling" 3 Soft Matter 1530 (2007).
Heinz Schmid et al., "Preparation of Metallic Films on Elastomeric Stamps and their Application for Contact Processing and Contact Printing" 13 Adv. Funct. Mater. 145 (2003).
Cheryl S. Selvanayagam et al., "Nonlinear Thermal Stress/Strain Analyses of Copper Filled TSV (Through Silicon Via) and their Flip-Chip Microbumps" 32 III Trans. Adv. Pack. 720 (2009).
James S. Sharp and Richard. A. L. Jones, "Micro-buckling as a Route Towards Surface Patterning" 14 Adv. Mater. 799 (2002).
Pimpon Uttayarat et al., "Topographic Guidance of endothelial Cells on Silicone Sufraces with Micro—to Nanogrooves: Orientation of Actin Filaments and Focal Adhesions" 75 J. Biomed. Mater. Res. A 668 (2005).
Cunjiang Yu and Hanquing Jiang, "Forming Wrinkled Stiff Films on Polymeric Substrates at Room Temperature for Stretchable Interconnects Applications" 519 Thin Solid Films 818 (2010).
C. Yu et al., "Stretchable Supercapacitors Based on Buckled Single-Walled Carbon Nanotube Macrofilms", Adv. Mater., 21, pp. 4793-4797 (2009).
C. Yu et al., "A stretchable temperature sensor based on elastically buckled thin film devices on elastomeric substrates", Appl. Phys. Lett. 95, 141902 (2009).
H. Jiang et al., Finite deformation mechanics in buckled thin films on compliant supports, PNAS, vol. 104., No. 40, pp. 15607-15612 (2007).
D.-Y. Khang et al., "A Stretchable Form of Single-Crystal Silicon for High-Performance Electronics on Rubber Substrates", Science, vol. 311 pp. 208-212 (2006).

S.P. Lacour et al., "Stretchable Interconnects for Elastic Electronic Surfaces", Proc. IEEE, vol. 93, No. 8, pp. 1459-1467 (2005).
International Search Report and Written Opinion for PCT/US2014/065776, dated Apr. 22, 2015.
T Ma et al., "Micro-strain sensing using wrinkled stiff thin films on soft substrates as tunable optical grating", Optics Express, vol. 21, No. 10, pp. 11994-12001 (2013).
X. Jiang et al., "Controlling Mammalian Cell Spreading and Cytoskeletal Arrangement with Conveniently Fabricated Continuous Wavy Features on Poly(dimethylsiloxane)", Langmuir 18(8), 3273-3280 (2002).
S. Wagner et al., "Electronic skin: architecture and components," Physica E 25(2-3), 326-334 (2004).
S. P. Lacour et al., "Design and performance of thin metal film interconnects for skin-like electronic circuits," IEEE Electron Device Lett. 25(4), 179-181 (2004).
S. P. Lacour et al., "Stretchable gold conductors on elastomeric substrates," Appl. Phys. Lett. 82(15), 2404-2406 (2003).
S. P. Lacour, S. Wagner, R. J. Narayan, T. Li, and Z. Suo, "Stiff subcircuit islands of diamondlike carbon for stretchable electronics," J. Appl. Phys. 100(1), 014913 (2006).
H. Q. Jiang et al., "Mechanics of precisely controlled thin film buckling on elastomeric substrate," Appl. Phys. Lett. 90(13), 133119 (2007).
K.M. Choi et al., "A photocurable poly(dimethylsiloxane) chemistry designed for soft lithographic molding and printing in the nanometer regime," J. Am. Chem. Soc. 125(14), 4060-4061 (2003).
PCT/US2015/068038 International Search Report and Written Opinion of the International Searching Authority dated May 4, 2016 (9 pages).
Asundi et al., "Optical strain sensor using position-sensitive detector and diffraction grating: error analysis," Optical Engineering 39.6 (2000): 1645-1651.

* cited by examiner

STRETCHABLE BATTERIES

CROSS-REFERENCE TO RELATED APPLICATION

This application claims priority to U.S. Provisional Patent Application No. 62/056,187, filed Sep. 26, 2014, the entire disclosure of which is hereby incorporated by reference.

FIELD OF THE INVENTION

The present invention relates to a flexible and stretchable battery and a method for producing the same.

BACKGROUND OF THE INVENTION

Due to the recent spread of portable (including wearable) electronic devices with compact designs, batteries for supplying electric power to those devices are required to be thinner, more flexible, and more stretchable. Energy storage devices, such as supercapacitors and lithium-ion batteries (LIBs), which are able to sustain large strains (much greater than 1%) under complex deformations (for instance, bending, tension/compression, and torsion) are indispensable components for flexible, stretchable electronics. Recently, wearable electronics, such as flexible displays, stretchable circuits, hemispherical electronic eyes, and epidermal electronics have emerged. Various approaches have been employed to achieve flexible and stretchable energy storage devices, such as thin film based bendable supercapacitors and batteries, buckling-based stretchable supercapacitors, and island-serpentine-based stretchable LIBs. Recently, an origami-based approach was adopted to develop highly deformable LIBs, where standard LIBs were produced followed by designated origami folding. The folding endows the origami LIB with a high level of deformability by changing the LIB from a planar state to a folded state. In this way, the LIBs are capable of being incorporated into portable and wearable electronic devices.

However, previously developed origami-based flexible and stretchable devices have two disadvantages. First, their stretchability is limited from the folded state to the planar state. Although it can be tuned by different folding patterns, the constraint is still prescribed by the planar state. As such, their deformability is limited and, as such, their use is limited. Second, the folded state involves uneven surfaces, which may introduce inconvenience when integrating with functional devices.

Therefore, there remains a need for a flexible and stretchable battery that is stretchable beyond its planar state while still remaining functional. Further, flexible and stretchable batteries that can be integrated within portable and wearable electronic devices are desired.

SUMMARY OF THE INVENTION

The present invention provides flexible and stretchable batteries by combining folding and cutting to define patterns that form an even (or close to even) surface after stretching, whereby the stretchability is not limited by the planar state of the battery. The art of folding and cutting to form various shapes is known as kirigami. The principle of the invention is to utilize rotation and/or bending of the interconnection and structure to release the stress during stretching and twisting the system to produce stretchability. One way to produce such a battery is by folding the flat sheet battery, and then cutting the battery so that when the battery is unfolded it is able to stretch beyond its planar state. Alternative ways may include the process sequences of a combination of zero or multiple times of cutting, folding and unfolding following designed patterns. Any cutting patterns that allow for stretching of the battery beyond its flat planar dimension are appropriate. In this application, the word "stretch" includes deformation formats of stretching and contracting, and the word "stretchability" includes deformation capability of stretching and contracting.

Accordingly, an object of the invention is to provide a flexible and stretchable battery that contains a cutting pattern that enables the battery to stretch beyond its planar state in all dimensions. The flexible and stretchable battery includes an assembly having an anode side and a cathode side separated by a separator and sealed in a packaging. The assembly is in a folded configuration and contains at least one cut therein, such that when the assembly is unfolded, it is able to stretch beyond its flat planar state in all dimensions.

Another object of the present invention is to provide a method of making a flexible and stretchable battery. The method involves forming an assembly having an anode side and a cathode side separated by a separator and sealed in a packaging. The assembly is folded and cut, such that when the assembly is unfolded, it is able to stretch beyond its flat planar state in all dimensions.

Alternatively, some methods involve providing a battery in a flat planar form, processing the battery with the sequence of combination of zero or multiple times of cutting, folding and unfolding following designed patterns to allow the battery to be stretched beyond its planar state in all dimensions. According to one aspect, the battery is folded into a corrugated pattern before cutting. The cutting is such that it produces a cutting pattern on the battery. The cutting is based on the art of kirigami which starts with a folded base which is then cut. The cuts are then opened and flattened to make the finished kirigami which contains symmetrical and repeated cutting patterns.

A further object of the invention is to provide an electronic device containing the flexible and stretchable battery of the invention. The device can be, for example, a smart watch, a smart arm band, a smart bracelet, a smart head band, and so on.

BRIEF SUMMARY OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Five kirigami patterns are utilized, as illustrated in FIGS. 1(a)-(e), with (a) a zigzag-cut pattern, (b) a cut-N-twist pattern, (c) a cut-N-shear pattern; (d) a cut-N-rotate pattern; and (e) a spiral cut pattern. The first three patterns are the focus of the invention.

Figure 1A:
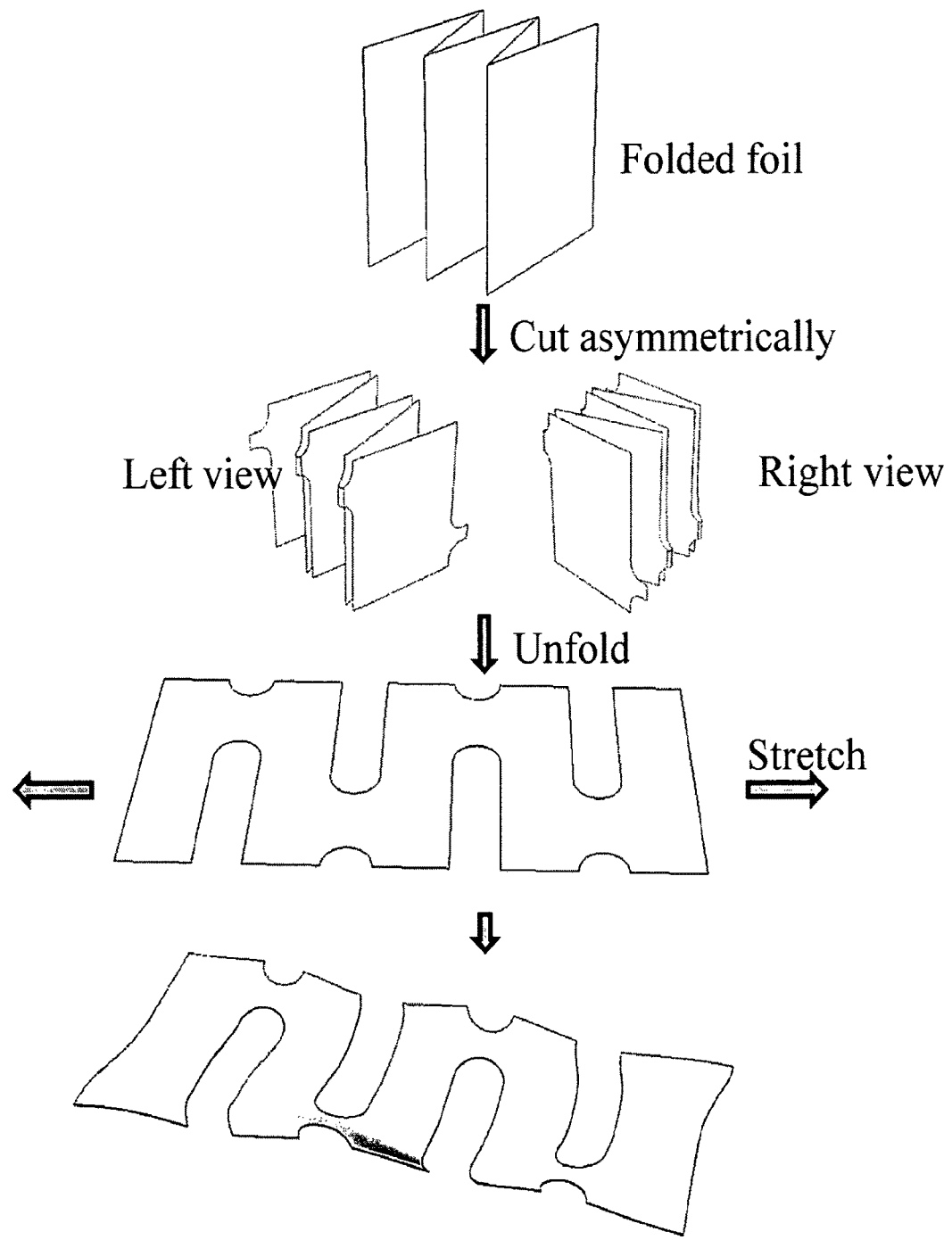
FIGS. 1(a)-1(e) are illustrations of five kirigami patterns according to embodiments of the invention.

The zigzag-cut pattern (FIG. 1(a)) represents one of the most commonly seen kirigami patterns and is produced by cutting a folded stack of foil asymmetrically between the neighboring creases, which defines zigzag-like cuttings in the longitudinal direction. The zigzag pattern can be stretched beyond its length in the planar state, which is the desired advantage of kirigami. To accommodate stretching, the out-of-plane deformation (or equivalently, buckling) occurs at the vicinity of cuts. The level of stretchability depends on the length of the cut and is a function of buckling amplitude.

Figure 1B:
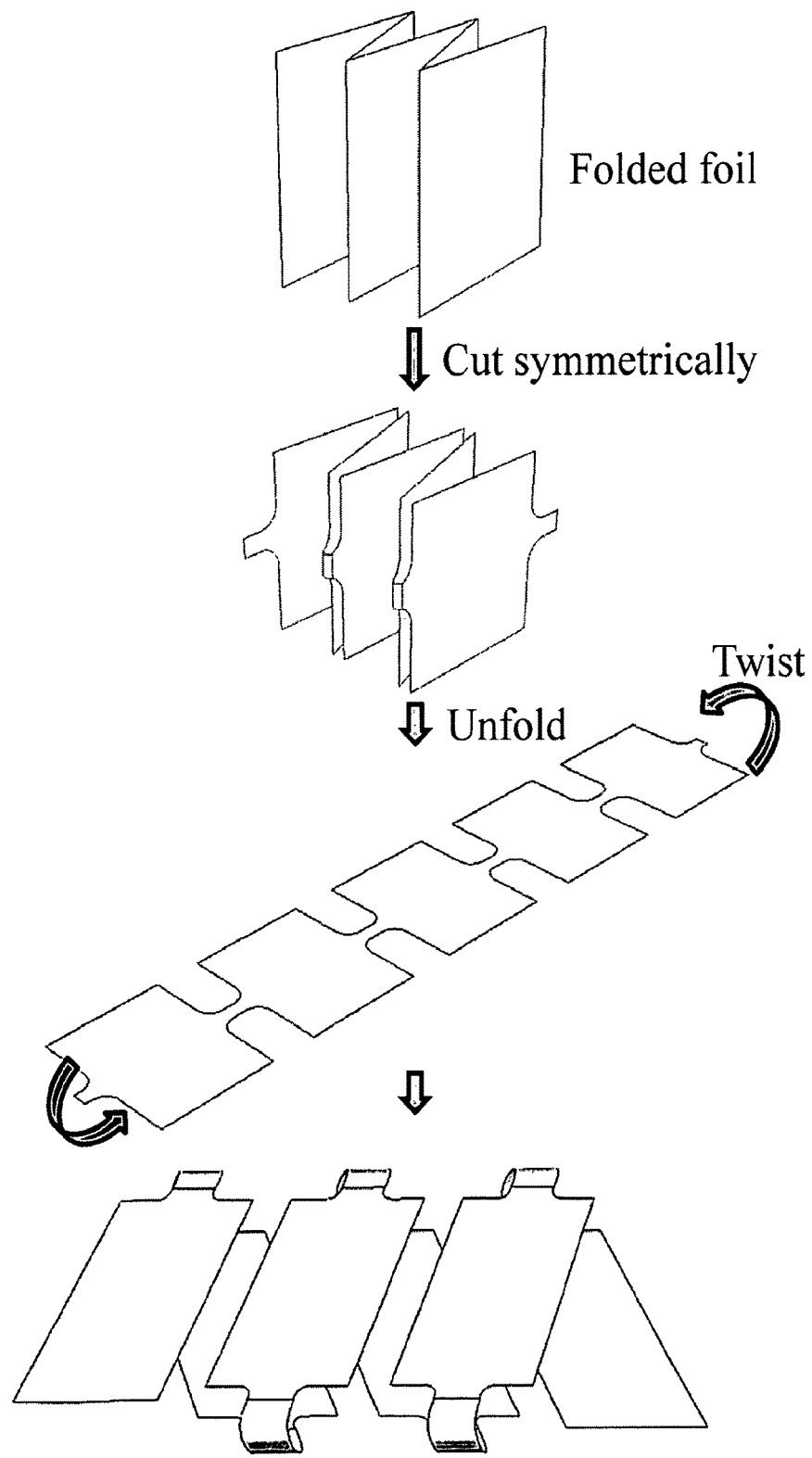

To eliminate the out-of-plane deformation, the cut-N-twist pattern (FIG. 1(b)) is utilized, in which a folded stack of foil is symmetrically cut at all creases, and then unfolded to a planar state, followed by twisting at the two ends. The twisted structure is shown in the bottom panel of FIG. 1(b) and is analogous to a twisted telephone cord. This pattern represents a locked structure in a sense that the out-of-plane deformation, induced by stretching, is constrained, and rotation and bending occurs at the cuts to accommodate stretching. The packing density of a cut-N-twist pattern is defined by the width of each face. Electrochemical and mechanical characterization results for LIB s using a cut-N-twist pattern show that the stretchability of a kirigami LIB is over 100% as compared to its most compact state. It should be noted that there is no significant change in the thickness (h) of this LIB between its most compact state (h=1.31 mm) and its most stretched state (h=1.07 mm).

Figure 1C:
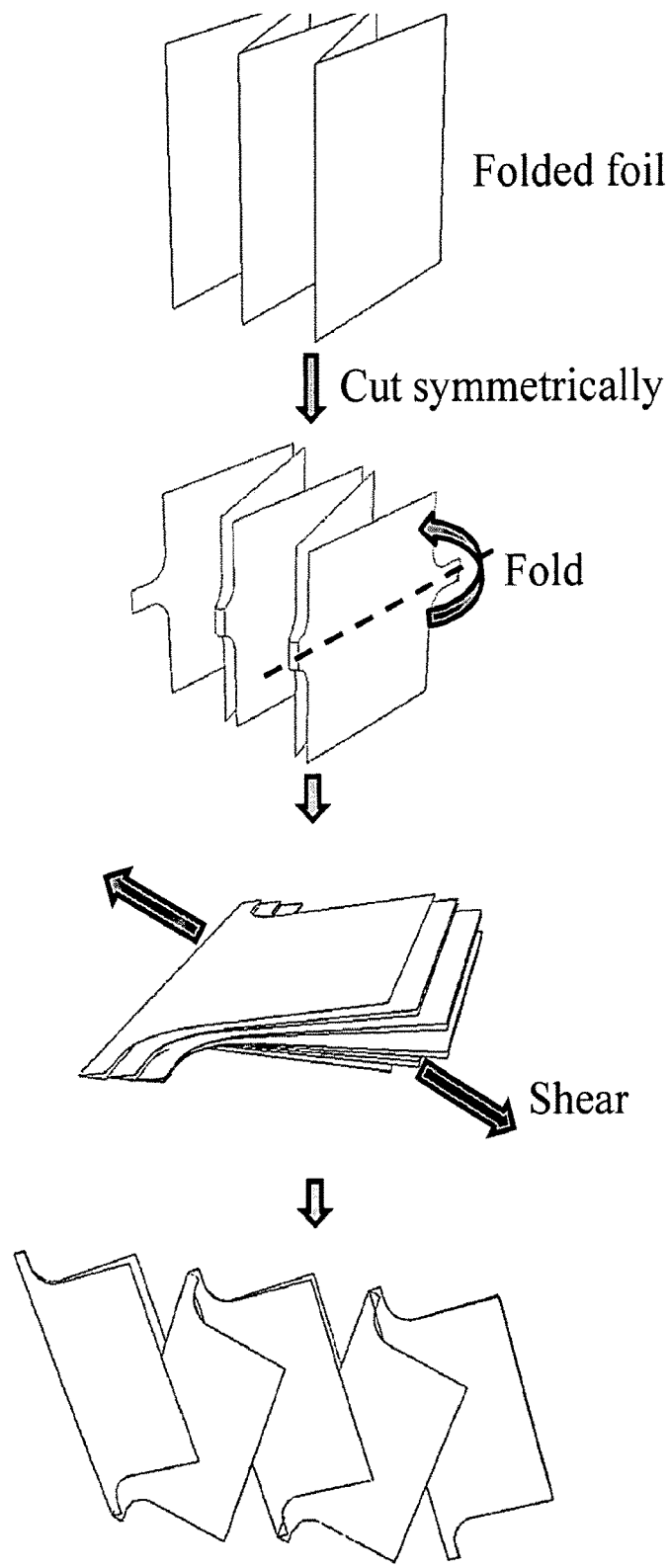
Figure 1D:
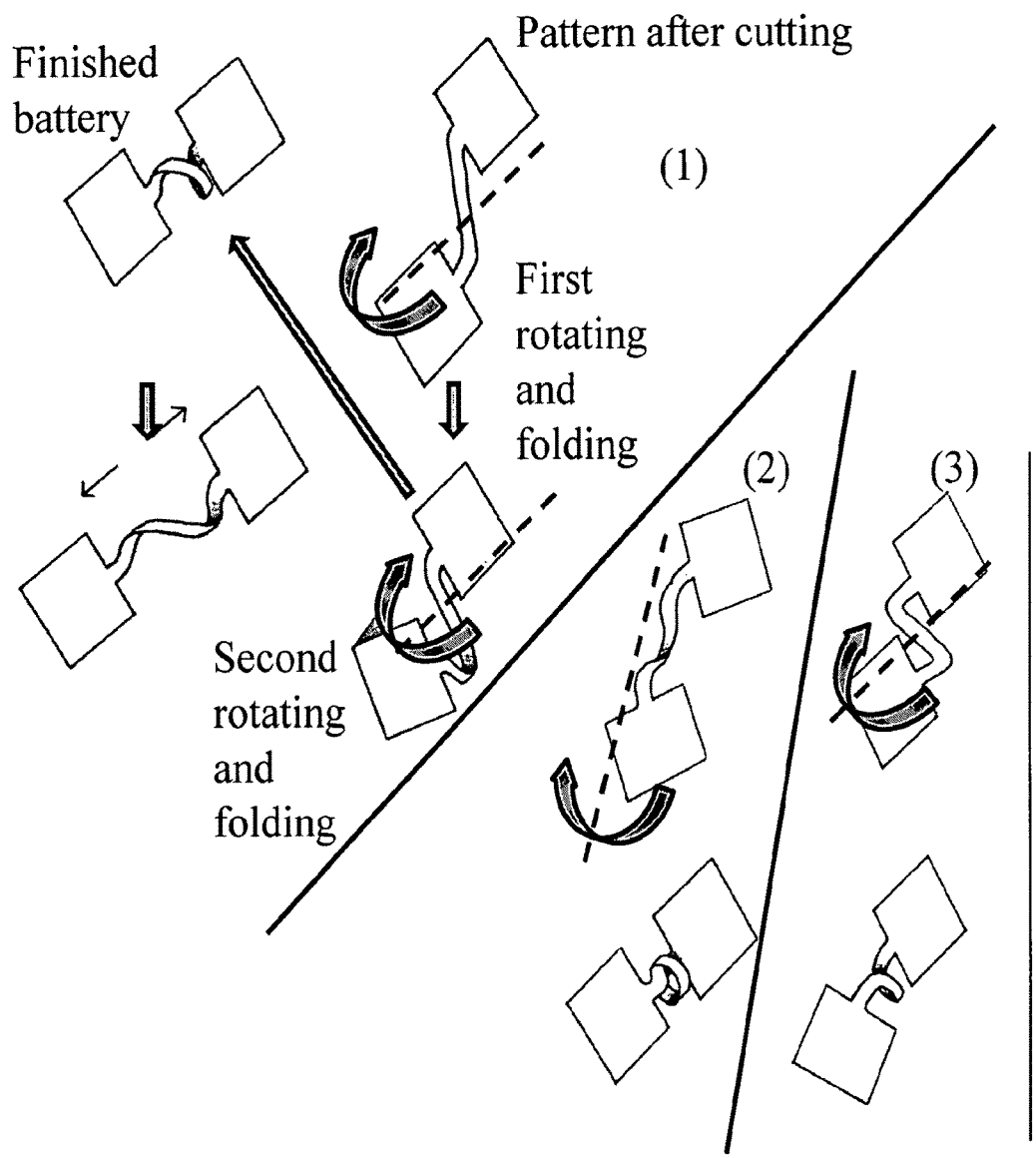
Figure 1E:
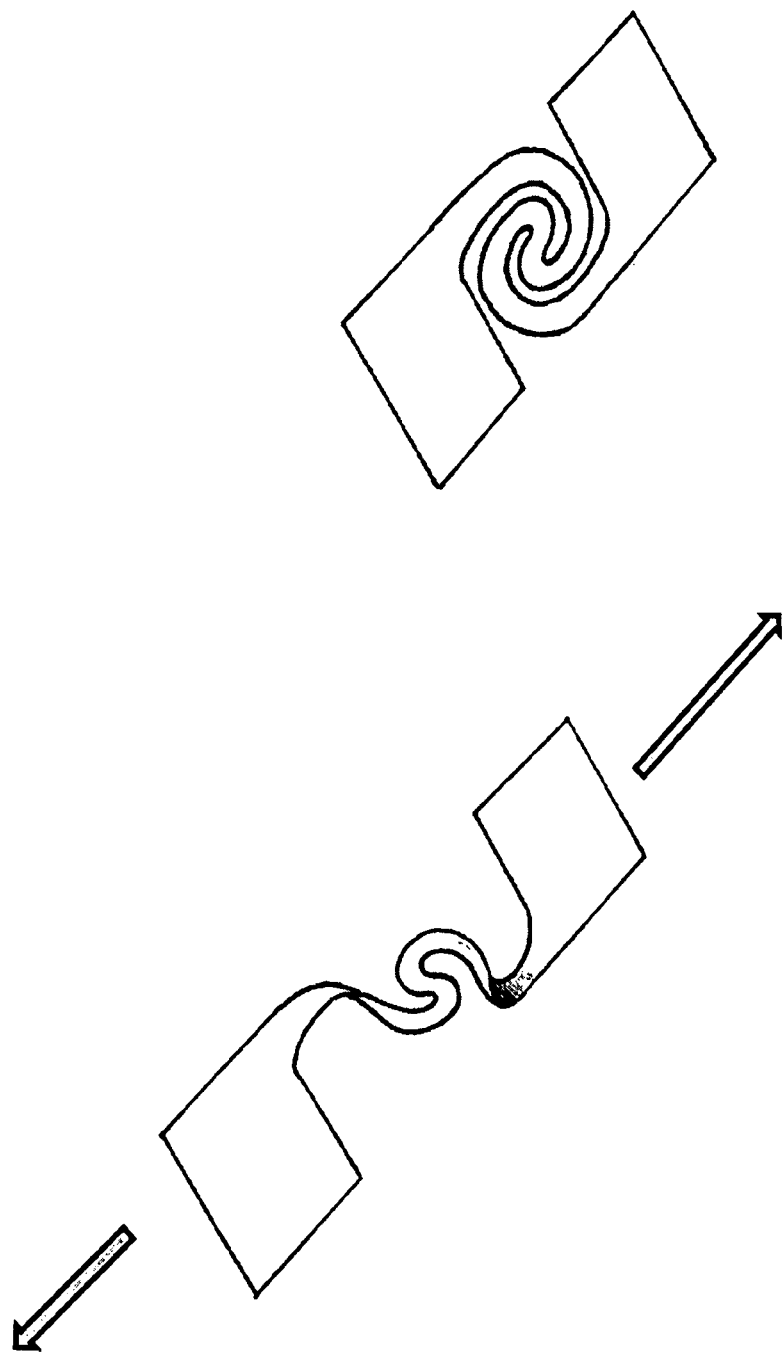

To increase the packing density, the cut-N-shear pattern (FIG. 1(c)) is introduced, where folding is employed after symmetric cutting and then the folded structure is subjected to shear to form the cut-N-shear pattern as shown in FIG. 1(c). Thus, the packing density doubles compared with that for the cut-N-twist pattern. The stretching is also realized by the rotations and bending of the cuts and no out-of-plane deformation is involved.

Kirigami LIBs, specifically the LIBs using cut-N-twist, cut-N-shear, zigzag-cut patterns illustrated in FIGS. 1(a)-(c), are demonstrated. Conventional materials and approaches for LIB preparation were used, specifically utilizing graphite (available commercially from Fisher Scientific Inc.) and $LiCoO_2$ (LCO, available commercially from MTI Corp.) as anode and cathode active materials, respectively. Conventional slurries of these active materials were prepared and used to coat the current collectors, where copper (Cu) and aluminum (Al) served as the anode and cathode current collectors, respectively. The battery cells were assembled by following designated folding and cutting based on the kirigami patterns of FIGS. 1(a)-(c) in an argon-filled glovebox using polypropylene (available commercially as Celgard 2500), 1 M $LiPF_6$ in EC:DMC:DEC (1:1:1) (available commercially from MTI Corp.), and aluminized polyethylene (PE) (available commercially from Sigma-Aldrich Corp.) as separator, electrolyte, and packaging materials, respectively. Extra care was taken to ensure no short circuits or leakage at the cuts during assembly.

Figure 2A:
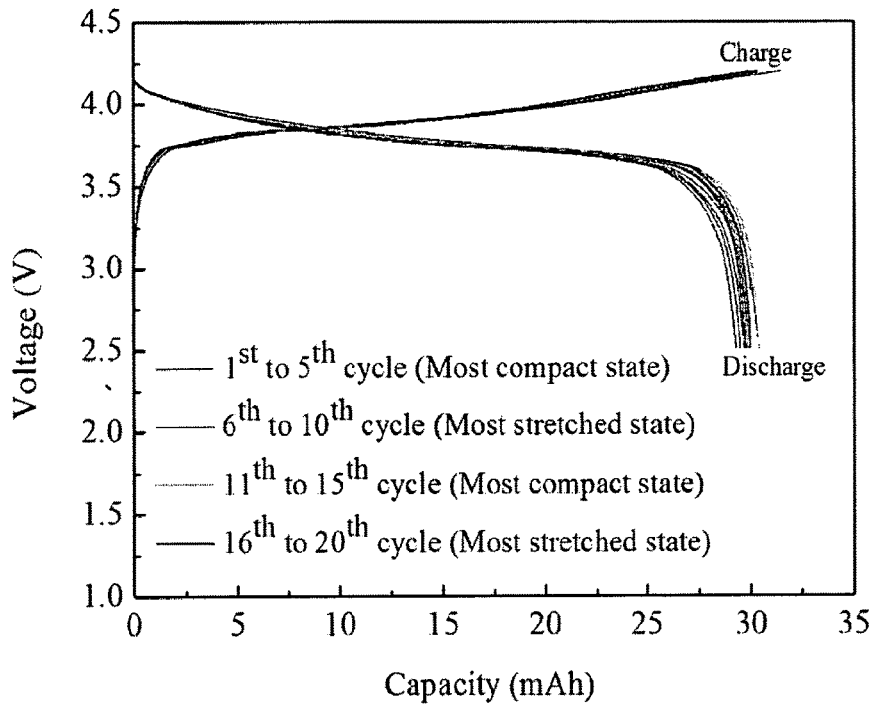
FIG. 2(a) is a graph of galvanostatic charge and discharge of a kirigami LIB prepared using a cut-N-twist pattern at various compact and stretched states depicting voltage as a function of capacity.

FIG. 2(a) is a graph illustrating the electrochemical cycling results of the kirigami LIB disclosed in FIG. 1(b) (a cut-N-twist pattern) at its most compact state (for the $1^{st}$ to $5^{th}$ cycles), followed by that at its most stretched state (for the $6^{th}$ to $10^{th}$ cycles), then that at its most compact state again (for the $11^{th}$ to $15^{th}$ cycles), and then that at its most stretched state again (for the $16^{th}$ to $20^{th}$ cycles) under the current density of 50 mA $g^{-1}$. Well-defined plateaus at around 3.7V are observed along with fairly stable charge/discharge behaviors under compact and stretched states. The present mass loading gives this kirigami LIB about 35 mAh energy capacity. The mass loading of $LiCoO_2$ (LCO) (specific capacity of 145 mAh $g^{-1}$) and graphite (specific capacity of 372 mAh $g^{-1}$) were 0.12 g and 0.28 g, respectively, which gave the LIB the capacity of 35 mAh.

Figure 2B:
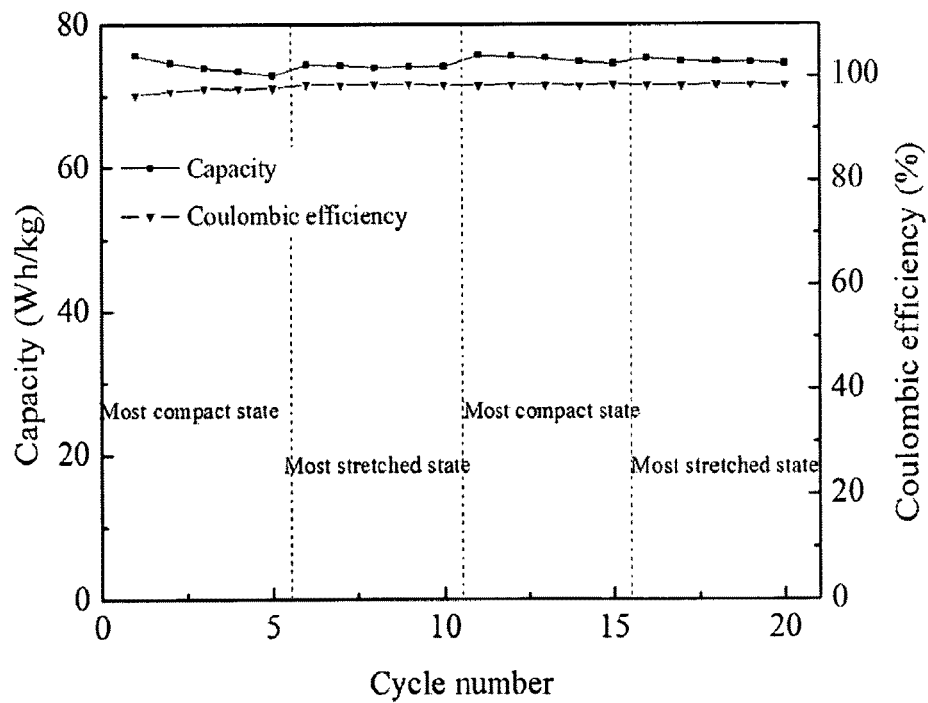
FIG. 2(b) is a graph of capacity and Coulombic efficiency of a kirigami LIB prepared using a cut-N-twist pattern as a function of cycle number for a specified current density.

FIG. 2(b) is a graph illustrating the capacity and Coulombic efficiency as a function of the cycle number of a kirigami LIB prepared using a cut-N-twist pattern for a current density of 50 mA$g^{-1}$. It shows the reasonable cyclic stability of the LIBs up to 20 cycles. It should be emphasized that this result represents the stability of this kirigami LIB at mixed states, i.e., both compact and stretched states. Another important point is that the energy density (in the unit of Wh/kg) in FIG. 2(d) is calculated using all materials in this LIB, including active materials, current collectors, electrolyte, and packaging. This energy density is comparable to the present commercially available LIBs. The mass accounts for all the materials involved in a cell, which is 1.49 g.

Figure 2C:
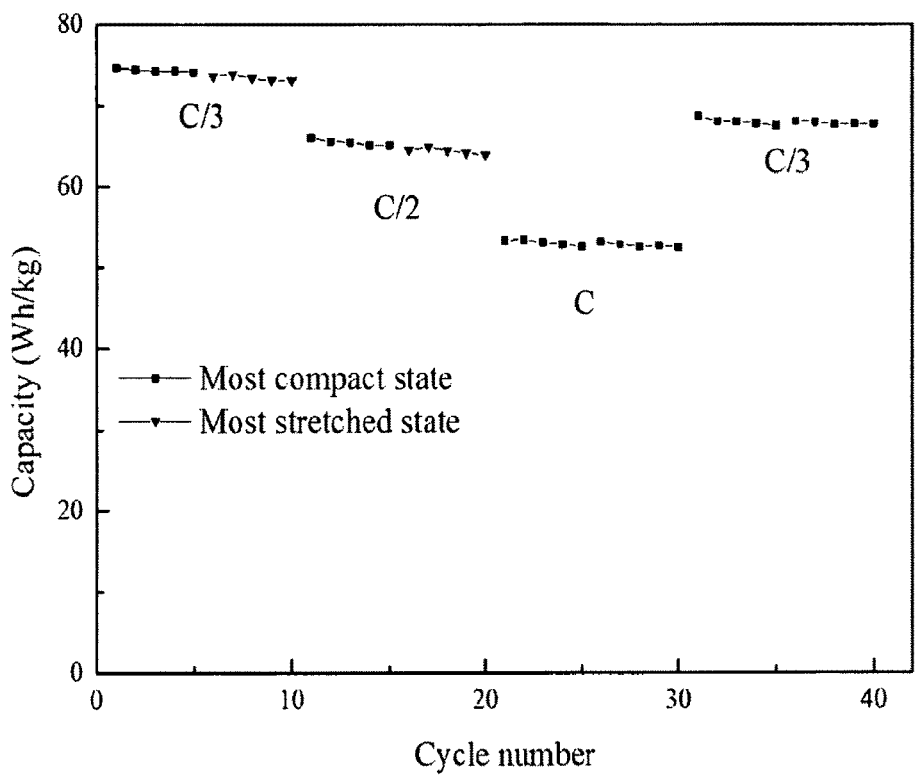
FIG. 2(c) is a graph of capacity as a function of cycle number of a kirigami LIB prepared using a cut-N-twist pattern at various compact and stretched states.
Figure 2D:
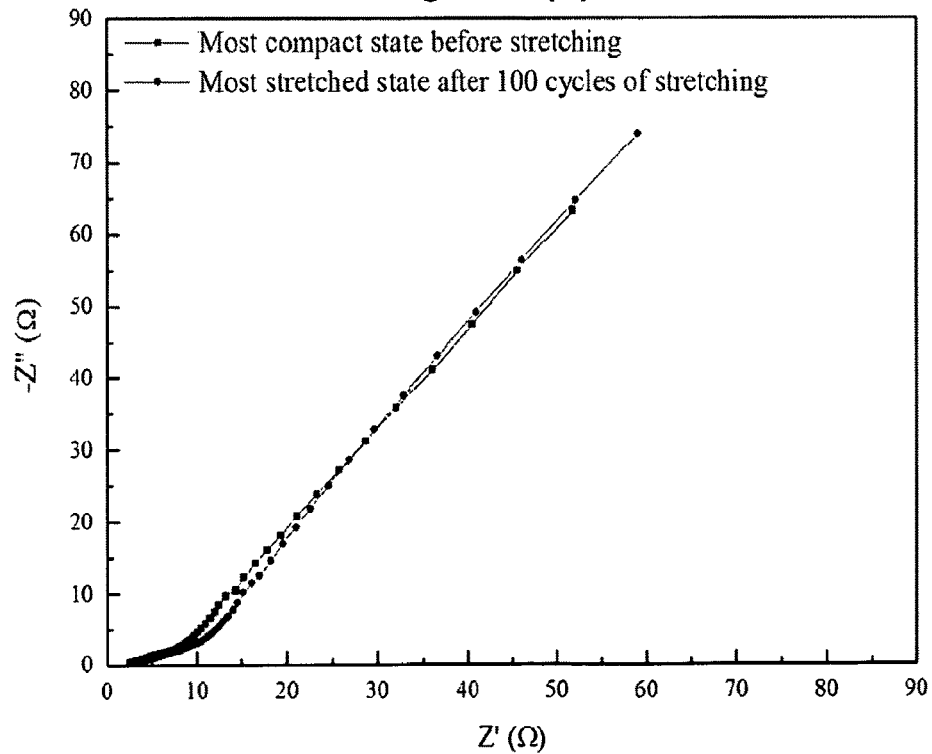
FIG. 2(d) is a graph of electrochemical impedance spectroscopy (EIS) analysis of a kirigami LIB prepared using a cut-N-twist pattern during the first discharge cycle at the most compact state before stretching, and at the stretched state after 100 stretching cycles.

FIG. 2c shows the rate performance of a kirigami LIB prepared using a cut-N-twist pattern when the charge/discharge rate varied in the sequence of C/3, C/2, C and C/3 again at both compact and stretched state. When discharge rates increase, as expected, the capacity decreases from 29.3 mAh for C/3 rate to 26.5 mAh for C/2 rate, and 21.4 mAh for discharge rate C. However, the capacity recovered to the 27.6 mAh when the discharge rate resumed to C/3 after 30 cycles charge/discharge at the both compact the stretched state under varies C-rates, which indicates good rate performance of this kirigami LIB.

FIG. 2(d) provides the results for electrochemical impedance spectroscopy (EIS) studies during the first discharge cycle at the most compact state before stretching and stretched state after 100 cycles of mechanical stretching for a kirigami LIB prepared using a cut-N-twist pattern. EIS studies were performed by applying a small perturbation voltage of 5 mV in the frequency range of 0.1 Hz to 100 kHz. Typical impedance spectrum, with high-to-middle frequency range flat curve and a relative straight line representing the low frequency range, was observed. No obvious semicircle was observed because of the low internal resistance. There are no significant changes in the impedance before and after mechanical deformation.

Figure 2E:
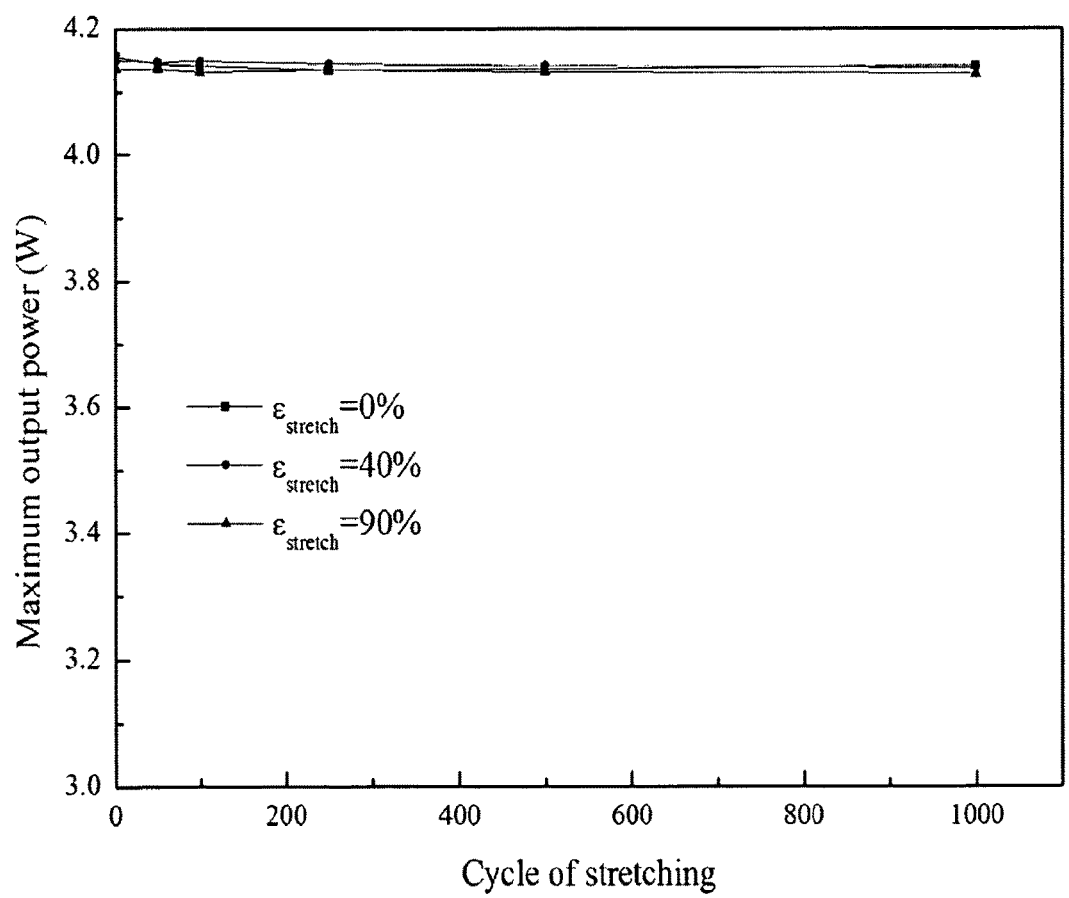
FIG. 2(e) is a graph of maximum output power of a kirigami LIB prepared using a cut-N-twist pattern as a function of stretchability over 1,000 cycles of stretches.

The mechanical characteristics of the fully charged kirigami LIB using the cut-N-twist pattern of FIG. 1(b) are then examined. At different stretchability levels, namely, 0%, 40%, and 90%, the output voltage remained steady at 3.8 V. FIG. 2(e) shows the maximum output power of the kirigami LIB as a function of stretchability, $\varepsilon_{stretch}$, under different cycles of stretching. Here, the internal resistance of the battery was measured to be about 1.8Ω. Over 1,000 stretching cycles and a stretchability $\varepsilon_{stretch}$ of up to 90%, it is found that the output power is quite stable and shows no noticeable decay. The output power of 4.1 W is sufficient to operate commercial light-emitting diodes (LEDs). LEDs driven by a kirigami LIB formed using a cut-N-twist pattern do not show noticeable dimming upon cyclic stretching, from 0% (its most compact state) to 30% stretching to 70% stretching.

Figure 2F:
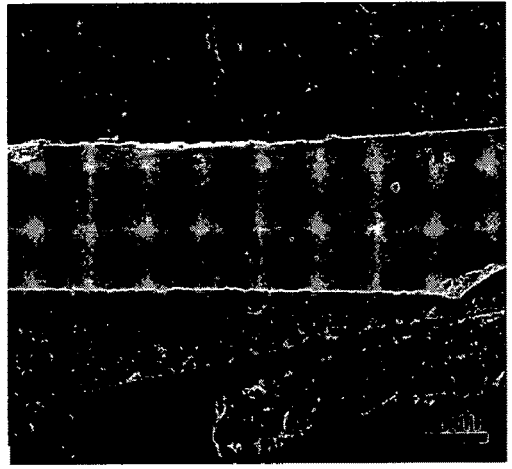
FIGS. 2(f)-(g) are scanning electron micrographs (SEMs) of anode current collector copper at a cut before charge and after discharge and 100 cycles of stretching of a kirigami LIB prepared using a cut-N-twist pattern, respectively.
Figure 2G:
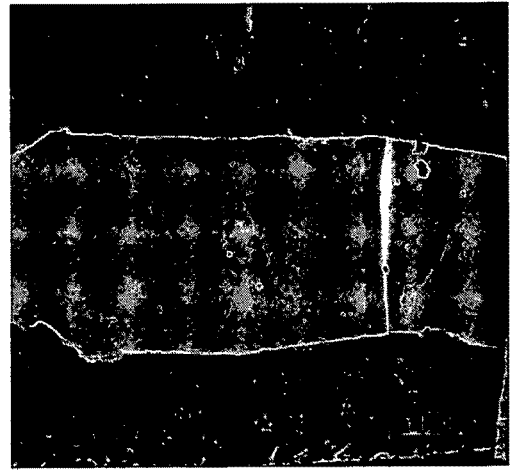
Figure 2H:
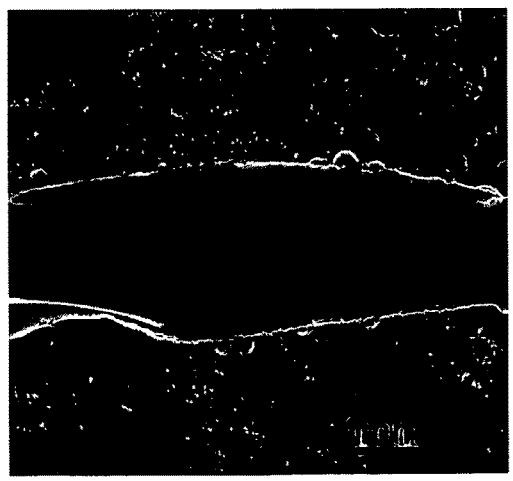
FIGS. 2(h)-2(i) are SEMs of cathode current collector aluminum at a cut before charge and after discharge and 100 cycles of stretching of kirigami LIB prepared using a cut-N-twist pattern, respectively.
Figure 2I:
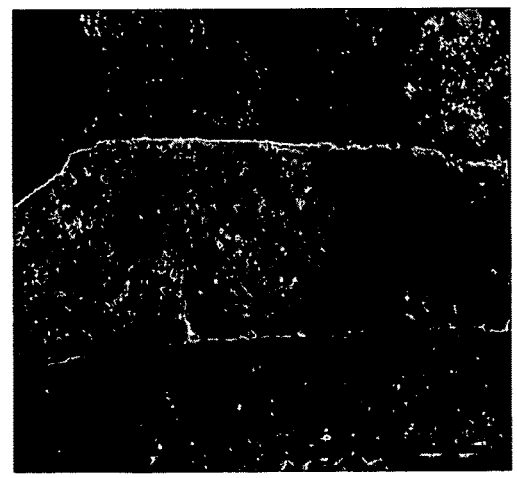

FIGS. 2(f)-(g) show scanning electron micrographs (SEMs) for the anode current collectors (e.g., copper foil) at the cuts before charging, and after discharge and 100 cycles of mechanical deformation for the cut-N-twist pattern of FIG. 1(b). Similar SEM images are given for the cathode current collectors (e.g., aluminum foils), as shown in FIGS. 2(h) and 2(i). There appear to be no cracks after cyclic mechanical stretching, which contributes to the robust electrochemical and mechanical characterizations.

Figure 3A:
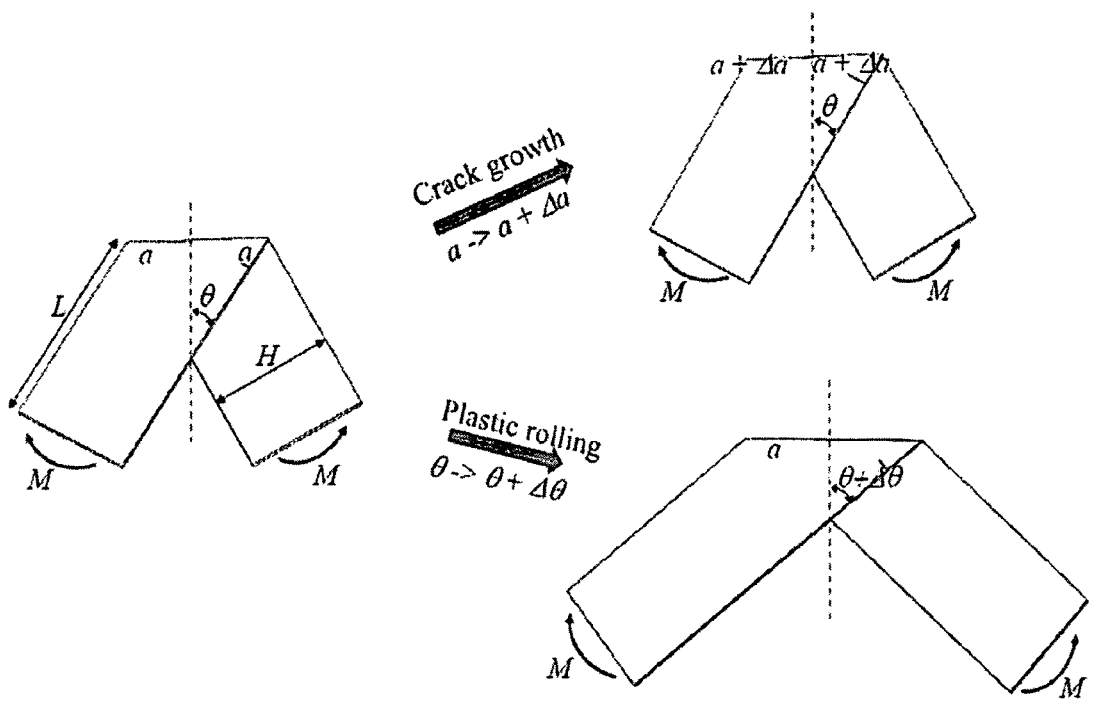
FIG. 3(a) is an illustration of two deformation modes, namely, crack growth versus plastic rolling, of kirigami LIBs according to an embodiment of the invention.

This phenomenon is consistent with the theoretical analysis and a simplified model as shown in FIG. 3(a), where two pre-existing cracks are presumably caused by initial folding and/or cutting, and are located at the present positions when a pair of concentrated moment M is applied at the end of the strip with length L and width H. The concentrated moment M is utilized to characterize the applied stretching deformation that causes bending about the folding creases. Angle θ is used to denote the relative positions of two strips with θ=0 for the initially folded position. When the moment M is applied, there exist two modes of deformation. The first mode causes the growth of the pre-existing cracks from a to α+Δα, while maintaining the angle θ unchanged, which refers to "crack growth". The second mode leads to plastic deformation of the thin foil at the vicinity of the fold by altering θ to θ+Δθ, which refers to "plastic rolling".

The critical condition for "crack growth" is given by the Griffith's criterion. The driving force, or the release of the elastic energy due to the propagation of cracks, $A\sigma^2\alpha/E$ equates to the resistance of the crack growth, defined by 2γ. Here A is a non-dimensional geometrical factor that depends on angle θ, i.e., A=A(θ); σ is the normal traction applied on the crack surface and related to the moment M by $\sigma=6M/H^2$; E is the elastic modulus; and γ [unit: Newton/meter] is the surface energy. Thus the critical moment for "crack growth" is given by $M_{cr}^{crack\ growth}=H^2\sqrt{E\gamma/(2A\alpha)}/3$. For "plastic rolling", the rate of energy dissipation due to the plastic deformation during the rolling about the creases provides the resistance, given by $\beta H^2(1+\tan^2\theta)/4$; and the driving force is the rate of release of potential energy due to the increase of θ, given by M/2. Here β [unit: Newton/meter$^2$] is the dissipated energy per unit area due to plastic rolling, which is related to the extent of the plastic deformation (i.e., hard crease versus soft crease) and can be associated with the yield stress of plastic materials. The critical condition for "plastic rolling" is given by $M_{cr}^{plastic\ rolling}=\beta H^2(1+\tan^2\theta)/2$. When M is applied, the smaller one between $M_{cr}^{crack\ growth}$ and $M_{cr}^{plastic\ rolling}$ is activated as the critical moment during deformation, which leads to either "crack growth" mode, when $M_{cr}^{crack\ growth} < M_{cr}^{plastic\ rolling}$, or "plastic rolling" mode, when $M_{cr}^{plastic\ rolling} < M_{cr}^{crack\ growth}$.

Finite element simulations were conducted using the commercially available package ABAQUS to analyze these two deformation modes. Because in an LIB, Al foil tends to crack due to its low fracture toughness, the material parameters of Al were used in the analysis, with the surface energy γ 0.868 N/m, elastic modulus E 69 GPa, and Poisson's ratio ν 0.33. The geometry is H=3 mm, and L=10 mm to match with the experiments. The pre-existing crack is assumed small as compared with the width H. β, dissipated plastic energy per area, is calculated by folding a 10 μm-thick Al foil (the same thickness as that used in LIB) with different folding radius via finite element simulations.

Figure 3B:
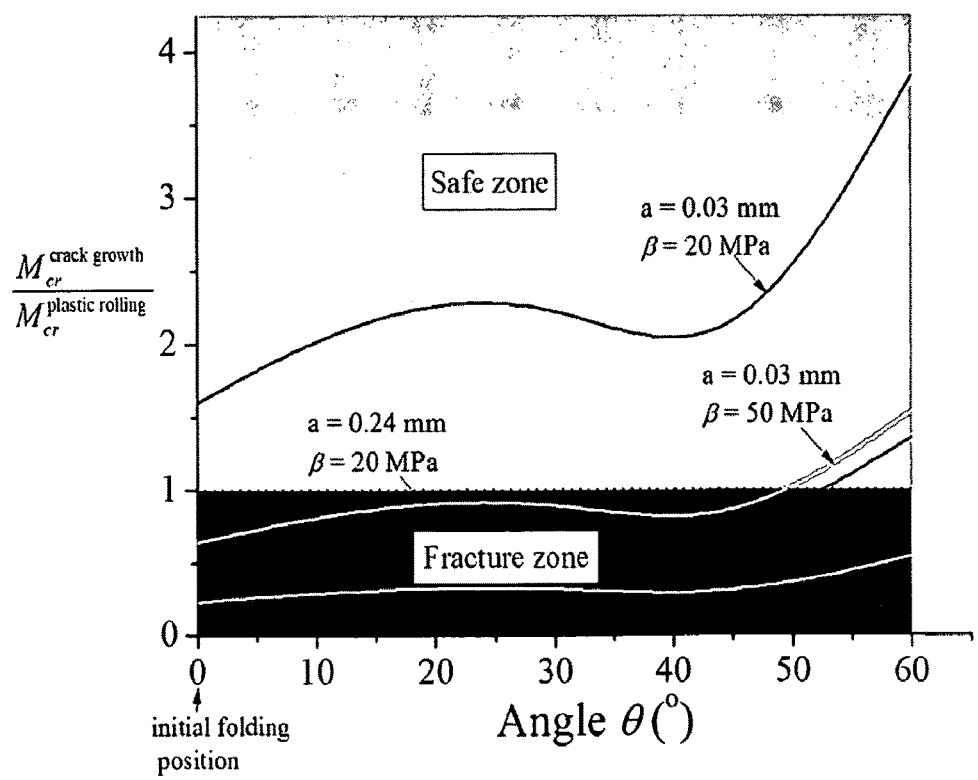
FIG. 3(b) is a graph illustrating the "safe zone" and "fracture zone" of a kirigami LIB characterized by the ratio of critical moments, $M_{cr}^{crack\ growth}/M_{cr}^{plastic\ rolling}$ as a function of angle θ, for various α and β.

FIG. 3(b) illustrates the "safe zone" (i.e., $M_{cr}^{crack\ growth}/M_{cr}^{plastic\ rolling} > 1$) and the "fracture zone" (i.e., $M_{cr}^{crack\ growth}/M_{cr}^{plastic\ rolling} < 1$) as a function of θ for various α and β. For example, α=0.03 mm (i.e., 1% of H, the width of strip) and β=20 MPa, corresponds to making a sharp crease of a 10 μm-thick Al foil with bending diameter of 70 μm (see FIG. 13), "safe mode" is activated for all angles of θ. The results also show that for a larger β (or equivalently shaper crease) or a (i.e., larger initial crack), "fracture mode" tends to occur. It is important to note from FIG. 12 that for the present battery setup (i.e., bending diameter ranging from 500 μm to 800 μm), β is on the order of 1 MPa, which indicates that it is always the scenario to activate the "safe mode". Thus, this analysis verifies that the robust electrochemical and mechanical performance of the kirigami LIB is due to the activated "safe mode".

Figure 4A:
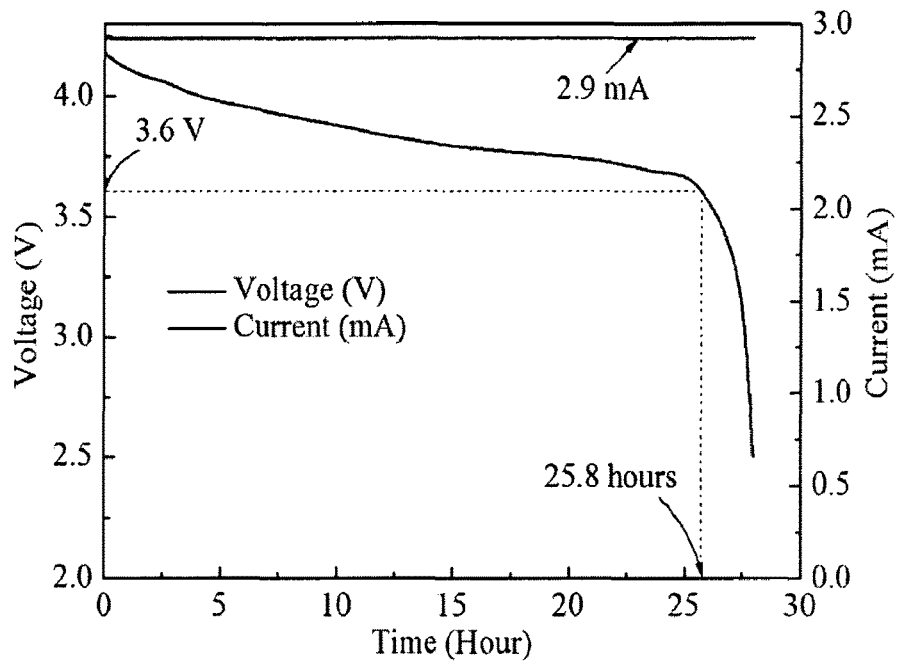
FIGS. 4(a)-(b) are graphs illustrating voltage as a function of time for a kirigami LIB prepared using a cut-N-twist pattern that was incorporated into an electronic device according to an embodiment of the invention.
Figure 4B:
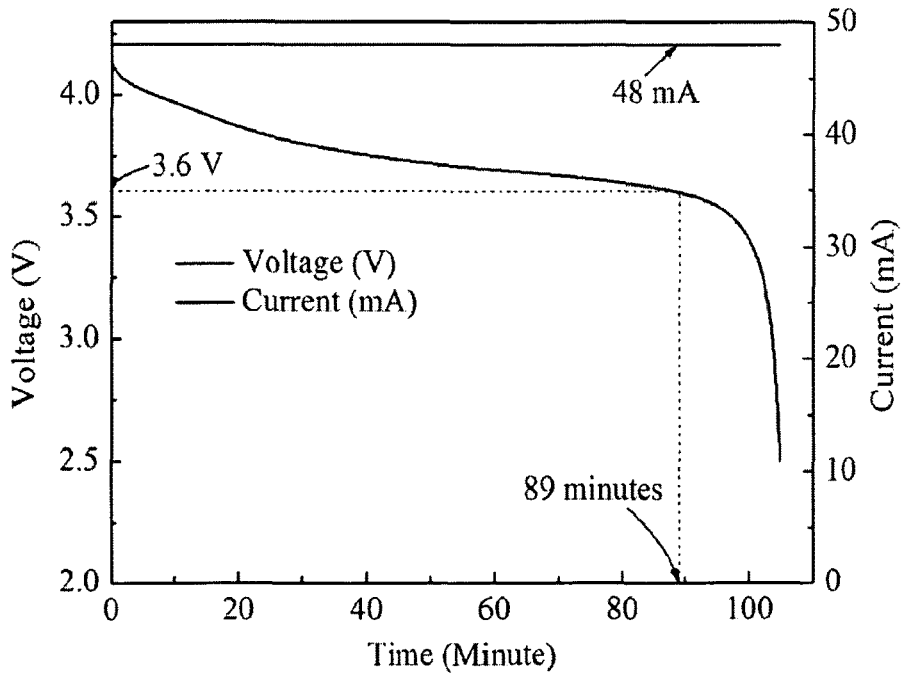

The stretchable kirigami LIBs disclosed herein are able to power an electronic device, e.g., a Samsung Gear 2 smart watch. The original LIB with an energy capacity of 300 mAh was removed from the Samsung Gear 2 device and a kirigami LIB using cut-N-twist pattern as disclosed herein was connected to the device. The mass loading for active materials are 0.26 g for graphite, 0.65 g for LCO, which gives the energy capacity 80 mAh. At the compact state, the kirigami LIB is 51.3 mm in length, 27 mm in width, and 2.6 mm in thickness. The produced kirigami LIB was sewn between two elastic bands at its two ends and wrapped around the wrist, allowing the elastic bands to function as an elastic watch strap. By sewing the kirigami LIB to the elastic band at the two ends, the LIB can be stretched and contracted, driven by the elasticity of the band. When the elastic band and the kirigami LIB were at their most compact states, the Samsung Gear 2 was just turned on (at the wrist of the user). Then, while the elastic band was stretched from the wrist to the upper arm, the Samsung Gear 2 was working normally. It is estimated from the circumferences of the wrist and upper arm, the kirigami LIB was subjected to a strain of 30%, lower than its full stretchability. While the elbow was bent and straightened, the smart watch was able to maintain normal functionality, and even display a video. During bending and straightening of the elbow, the biceps introduced an additional 15% strain to the kirigami LIB. Finally, the kirigami LIB was removed from the elastic bands and stretched directly while powering the smart watch. This experiment demonstrates the promises of using a kirigami LIB to replace present rigid and bulky batteries and to power a commercial smart watch, which has been a bottle-neck to develop compact wearable devices. It is worth mentioning that if the kirigami LIB is scaled up to cover the entire area of the elastic band (25 cm in length, 3 cm in width), the energy capacity is about 700 mAh, which significantly exceeds the current LIB used in most smart watches by using the space of the watch strap instead of using the limited space of watch body, and may disruptively impact the field of wearable electronics by offering extra physical and functionality design space. For a fully charged kirigami battery with 80 mAh capacity that was connected with a Samsung Gear 2 smart watch, the standby time was measured to be 24.5 hours. When the smart watch was paired with a Samsung Galaxy S5 cell phone with a Bluetooth connection when they were separated by 30 cm, the smart watch was able to make calls through the Bluetooth connection. The calling time was measured to be 90 minutes. To simulate the standby and calling tests, quantitative discharge characterizations were also conducted by applying the corresponding constant discharge currents for standby (2.9 mA) and calling (48 mA) using an Arbin electrochemical workstation. The stopping voltage of the smart watch was measured to be 3.6 V. As shown in FIG. 4(a) for the simulated standby test, the calling time (when the voltage drops to the stopping voltage 3.6 V) is 25.8 hours, which is consistent with the direct test. For the simulated calling test (FIG. 4(b)), the calling time is 90 minutes, which perfectly matches the direct test.

The demonstration of stretchable kirigami LIBs as set forth above only represents one application of this type of stretchable energy sources that fully utilize the mainstream manufacturing capability. Other applications may include smart bracelets and smart headbands among many others. It is expected that the kirigami LIBs are able to resolve one of the bottlenecks on the development of wearable devices by providing a scalable solution for a stretchable energy source. The competing mechanisms between "crack growth" and "plastic rolling" also provide a much broader spectrum of employing the concept of kirigami to other fields, such as in microelectromechanical systems (MEMS) where robust interconnects can be placed at the cut/fold locations and the functional devices are fabricated on the rigid faces, which leads to stretchable devices using standardized procedures. These areas appear promising for further research.

Figure 5:
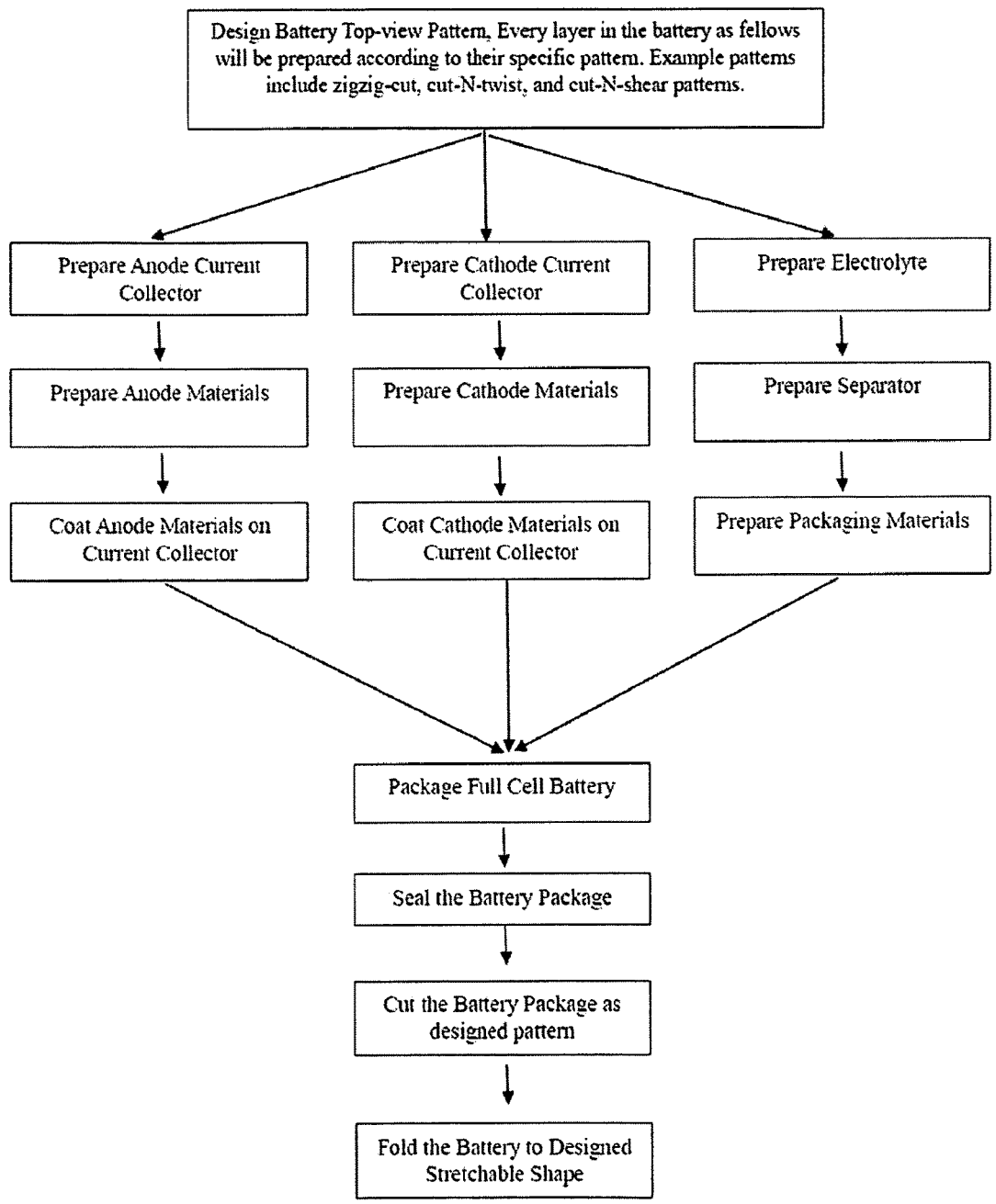
FIG. 5 is a flow diagram of a kirigami-based assembly process for a flexible and stretchable battery according to an embodiment of the invention.

FIG. 5 outlines the assembly of the battery of the present invention. First, the battery is designed with a specific cut pattern. The separator, anode side, and cathode side of the battery are prepared separately according to the specific cut patterns. Those components are then assembled and sealed inside the packaging material. The battery is then folded and cut to the designed pattern. Alternatively, the battery is then cut and folded to the designed pattern. Further alternatively, that battery is then processed with the designed sequence of combination of zero to multiple times of cutting, folding, and unfolding following designed patterns for a stretchable battery.

The packaging process ensures the good alignment of these multiple component layers. The packaging layers cover all the edges of battery, including cutting edges, to ensure leakage tight sealing of the packaging. The cutting pattern for each of the component layers of the battery may or may not be the same. The design of the patterns of different layers will ensure (1) the leak-tight sealing at the edges, (2) the integrity of the crease during the folding and unfolding of the kirigami battery, and (3) the integrity of the battery during the stretching.

Figure 6:
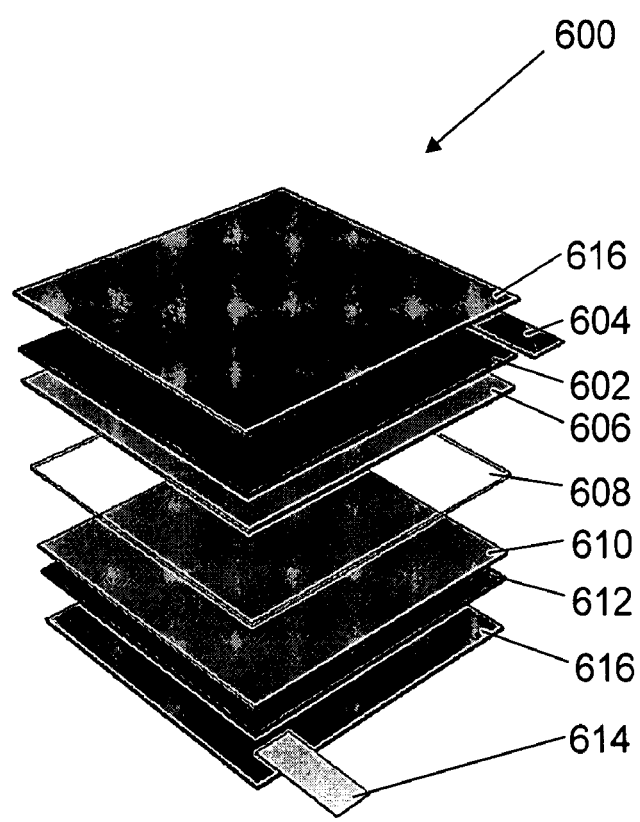
FIG. 6 is an exploded view of a multilayer structure of a lithium-ion battery according to an embodiment of the invention.

FIG. 6 shows a flat planar schematic of the battery of the present invention. The battery 600 illustrated in the figure includes a sheet-like stacking of several layers including: an anode current collector 602 in electrical connection with an anode electrode lead 604, an anode electrode 606, a separator 608, a cathode electrode 610, and a cathode current collector 612 in electrical connection with a cathode electrode lead 614. Essentially, the separator 608 separates the anode side of the battery 600 from the cathode side of the battery. A packaging material 616 is used to hermetically seal the stacking layers. Although the anode electrode lead 604 and cathode electrode 614 are noted in the Figure as anode electrode lead and the cathode electrode lead, respectively, other material can be used as known in the art. The anode and cathode electrode leads 604, 614 contain portions that extend outside of the packaging. Those extended portions function as a negative electrode terminal and a positive electrode terminal. The shape of the battery pack may be flat-plate like or curved-plate like. The thickness of the whole battery pack is less than about 10 mm, preferably from about 100 µm to 3 mm.

Sheet-like electrodes suitable for a thin battery are preferably used in the present invention. The plane shape of the electrode is not particularly limited, but is preferably circular, elliptic, belt-like, rectangular, or approximately rectangular. An "approximately rectangular" shape is, for example, a rectangular shape with four corners chamfered, or a rectangular shape with four corners rounded into arcs.

The anode side of the battery includes a negative electrode current collector and an anode electrode material layer adhering to one surface or both surfaces of the anode current collector 602, or the stack of multiple combinations of collector and electrode material layer. The anode electrode layer may be formed by: press-fitting or vapor-depositing a negative electrode active material to or on the negative electrode current collector; or alternatively, applying a material mixture including a negative electrode active material onto the anode current collector 602, followed by rolling.

The anode electrode material may be selected as appropriate from known materials and compositions. For example, a lithium-based negative electrode, various natural and artificial graphites, a silicide, a silicon oxide, or various alloy materials may be used to produce a thin battery with high energy density.

In the case of a lithium-based anode electrode, the negative electrode layer is preferably a lithium metal layer or a lithium alloy layer, which has a high capacity. Examples of the lithium alloy include Li—Si alloy, Li—Sn alloy, Li—Al alloy, Li—Ga alloy, Li—Mg alloy, and Li—In alloy. In view of improving the negative electrode capacity, the content of elements other than Li in the lithium alloy is preferably 0.1 to 10 mass %, and the content of lithium in the alloy is preferably 90 to 99.9 mass %.

The anode current collector 602 may be a metal foil, such as an electrolytic metal foil obtained by electrolysis or a rolled metal foil obtained by rolling. The electrolytic metal foil is obtained, for example, by immersing a drum (simulating an electrode) in an electrolytic bath containing a predetermined metal ion, passing a current through the drum while being rotated to deposit a predetermined metal on the surface of the drum, and separating the deposited metal from the drum. The electrolysis process is advantageous for excellent mass-productivity, and comparatively low production cost. The rolling process is advantageous for easy production of a thin metal foil, and weight reduction. The rolled metal foil, in which the crystals are oriented in the rolling direction, is excellent in bending resistance, and is suitably used for a thin battery.

The cathode side of the battery includes a cathode electrode current collector and a cathode electrode adhering to one surface or both surfaces of the cathode current collector, or a stack of multiple combinations of collector and electrode material. The cathode electrode layer is preferably formed by: vapor-depositing a positive electrode active material on the cathode current collector, or alternatively, applying a material mixture including a cathode electrode material onto the cathode current collector; and then rolling. The cathode electrode material mixture may further include a binder in addition to a cathode electrode material, and further includes a conductive agent, as needed.

Examples of the cathode electrode material include manganese dioxide; fluorinated carbons; organic or inorganic sulfides; lithium-containing composite oxides; metal oxides such as vanadium oxide or niobium oxide, or lithiated products thereof; conjugated organic polymer with conductivity; Chevrel-phase compounds; and olivine-type compounds. Preferred among them are manganese dioxide, fluorinated carbons, sulfides, and lithium-containing composite oxides, and particularly preferred is manganese dioxide.

Given that the reaction of manganese dioxide in the battery is a one-electron reaction, the theoretical capacity per mass of the positive electrode active material is 308 mAh/g, which is a high capacity. In addition, manganese dioxide is inexpensive. A particularly preferred manganese dioxide is electrolytic manganese dioxide because it is easily available. Manganese dioxide may contain a very small amount of impurities which have inevitably entered in the production process. The positive electrode active material may be a mixture which is mainly composed of manganese dioxide and contains a material other than manganese dioxide, such as a fluorinated carbon, vanadium oxide, or olivine-type compound.

Examples of the fluorinated carbons include fluorinated graphite represented by $(CF_w)_m$, where m is an integer of one or more, and $0 < w \leq 1$. Examples of the sulfides include Ti6, Mo6, and Fe6. Examples of the lithium-containing composite oxides include $Li_{xa}CoO_2$, $LiNiO_2$, $Li_{xa}MnO_2$, $Li_{xa}Co_yNi_{1-y}O_2$, $Li_{xa}Co_yMi_{1-y}O_z$, $Li_{xa}Ni_{1-y}M_yO_z$, $Li_{xb}Mn_2O_4$, and $Li_{xb}Mn_{2-y}M_yO_4$. In the above formulae, M is at least one selected from the group consisting of Na, Mg, Sc, Y, Mn, Fe, $Co_y$, Ni, Cu, Zn, Al, Cr, Pb, Sb, and B; xa=0 to 1.2; xb=0 to 2; y=0 to 0.9; and z=2 to 2.3. The values of xa and xb are values before the start of charge and discharge, and increases and decreases during charge and discharge.

Examples of the conductive agent include graphites, such as natural graphite and artificial graphite; carbon blacks, such as acetylene black, Ketjen black, channel black, furnace black, lamp black, and thermal black; conductive fibers, such as carbon fiber and metallic fiber; metal powders, such as aluminum powder; conductive whiskers, such as zinc oxide whisker and potassium titanate whisker; conductive metal oxides, such as titanium oxide; and organic conductive materials, such as a phenylene derivative. The conductive agents may be used singly or in combination of two or more. In view of improving the conductivity of the cathode electrode layer and ensuring the positive electrode capacity, the content of the conductive agent in the positive electrode active material layer is preferably 1 to 30 parts by mass per 100 parts by mass of the positive electrode active material.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, and carboxymethyl cellulose.

The binders may be used singly or in combination of two or more. In view of improving the bonding property of the cathode electrode and ensuring the cathode electrode capacity, the content of the binder in the positive electrode active material layer is preferably 1 to 15 parts by mass per 100 parts by mass of the positive electrode active material.

The binder may be a polymer electrolyte. The presence of a polymer electrolyte in the cathode electrode layer facilitates diffusion of lithium ions, allowing for smooth transfer of lithium ions between the cathode current collector and the cathode electrode. The polymer electrolyte may be used singly as a binder, or in combination with another binder.

The positive electrode current collector may be, for example, a metal film, a metal foil, and a non-woven fabric made of a metal fiber. Examples of a metal material constituting the cathode current collector include silver, nickel, palladium, gold, platinum, aluminum, aluminum alloy, and stainless steel. One of them may singly constitute the current collector, or a combination of two or more of them may constitute the current collector.

The packaging material is preferably composed of a highly flexible material with excellent flex resistance (e.g., a film-like material). Preferably, the packaging material is composed of a laminated film, which includes a water-vapor barrier layer and a resin layer provided on one surface or both surfaces of the barrier layer. The barrier layer is preferably a metal layer or a ceramics layer.

The metal layer is preferably made of aluminum, titanium, nickel, stainless steel, gold, or silver for strength and bending resistance. The ceramic layer is preferably made of silicon oxide, magnesium oxide, or aluminum oxide. Among them, aluminum, aluminum oxide, and silicon oxide are particularly preferred due their low production cost and excellent barrier property.

The thickness of the barrier layer is preferably 10 to 70 μm. The thickness of the resin layer, both on the inside and the outside of the housing, is preferably 20 to 80 μm. The thickness of the laminated film is preferably 30 to 150 μm. By using a laminated film having such a thickness, it is possible to reduce the thickness of the thin battery, while ensuring the strength and flexibility of the packaging material.

In view of the strength, impact resistance, and electrolyte resistance, the resin layer on the inside of the packaging is preferably made of, for example, polyolefin such as polyethylene (PE) or polypropylene (PP), a modified product thereof, polyethylene terephthalate (PET), polybutylene terephthalate (PBT), polyamide, polyurethane, polyethylene-vinyl acetate copolymer (EVA), or an ionomer resin.

In view of the strength, impact resistance, and chemical resistance, the resin layer on the outside of the housing is preferably made of, for example, polyamide (PA) such as 6,6-nylon or 6-nylon, or polyester such as PET or PBT.

Preferably, the housing is made of, for example, an acid-modified-PP/PET/Al/PET laminated film, an acid-modified-PE/PA/Al/PET laminated film, an ionomer-resin/Ni/PE/PET laminated film, an EVA/PE/Al/PET laminated film, or an ionomer-resin/PET/Al/PET laminated film. The Al layer and Ni layer may be replaced with a ceramics layer such as an $Al_2O_3$ layer or $SiO_2$ layer.

The separator layer has a function of separating the anode side from the cathode side of the battery, and contains an electrolyte that allows for ion migration. The electrolyte may be liquid, gel or solid. A non-aqueous electrolyte is most preferred because it has a wide potential window. The separator layer may contain any component in addition to the electrolyte, as long as the purpose thereof is not impaired. For example, for the purpose of improving the strength, homogeneity, and ion conductivity of the electrolyte, a filler such as inorganic particles or resin particles may be added to the electrolyte. Examples of the inorganic particles include alumina fine particles and silica fine particles.

The separator 608 preferably has ion permeability, as well as excellent mechanical strength and insulating property. Examples of a material for such a separator include polypropylene, polyethylene, cellulose, polyethylene terephthalate, polyphenylene sulfide, polyamide, and polyimide. A preferred oriented sheet is a microporous film containing either polypropylene or polyethylene, or both. A separator including such a microporous film and a highly heat resistant layer of polyamide or the like laminated thereon has a shutdown function and is excellent in short-circuit resistance.

A liquid electrolyte may be a solution comprising a solvent and a solute (a supporting salt) dissolving in the solvent, and further comprising various additives, if necessary.

A gel electrolyte (a gel polymer electrolyte) is generally a gel containing a liquid electrolyte and a polymer material therewith serving as a matrix. The gel polymer electrolyte may be any polymer material that can be gelled by absorbing a liquid electrolyte. Examples of such a polymer material include: poly(meth)acrylate polymers having an ester unit, such as silicone, acrylic acid, acrylic acid ester, methacrylic acid, or methacrylic acid ester, as a principal component (e.g., 90 mol % or more); polyacrylonitrile; polyphosphazene; polyethylene oxide; polypropylene oxide; and fluorine polymer. These polymer materials may be used singly or as a mixture or composite of two or more. Furthermore, these polymer materials may be cross-linked or modified, as appropriate.

Among the above-exemplified polymer materials, a fluorine polymer, in particular, is highly resistive to oxidation and reduction, and thus is suitable for allowing a liquid non-aqueous electrolyte to be absorbed therein. It is preferable to use, for example, polyvinylidene fluoride, vinylidene fluoride-hexafluoropropylene copolymer, vinylidene fluoride-trifluoroethylene copolymer, or vinylidene fluoride-tetrafluoroethylene copolymer, singly or as a mixture of two or more.

A solid electrolyte may be a powder or deposited film of various inorganic solid electrolytes, or a dry polymer electrolyte. Examples of the inorganic solid electrolytes include: lithium halides such as lithium iodide, and derivatives thereof; lithium nitride; oxyacid salt-based materials; and sulfide-based materials. The dry polymer electrolyte is a polymer material with a solute (supporting salt) added thereto, and is free of solvent.

Examples of the polymer material serving as a matrix of the dry polymer electrolyte include: ether polymers such as polyethylene oxide, and cross-linked products thereof; and poly(meth)acrylate polymers. These may be a polymer of one monomer, or a copolymer of two or more monomers. These polymer materials may be used singly or as a mixture or composite of two or more.

Among the above examples, a separator containing a dry polymer electrolyte or gel polymer electrolyte is preferred, in view of preventing the electrolyte components from leaking outside in the event the packaging is damaged. Various fillers may be added to the dry polymer electrolyte or gel polymer electrolyte. Alternatively, the dry polymer electrolyte or gel polymer electrolyte is impregnated into or allowed to adhere to the separator serving as a support, to form an electrolyte layer.

When a dry polymer electrolyte or gel polymer electrolyte is used, it may not be necessary to provide a means for preventing the leakage of electrolyte. Therefore, it is possible to easily make the thin battery smaller in size, lighter in weight, and further thinner in thickness. Furthermore, by using a dry polymer electrolyte or gel polymer electrolyte, the separator layer becomes amenable to bending. As such, the adhesion between the electrodes may be further improved, and variations and deterioration of the battery performance are significantly suppressed even after repeated bending.

EXAMPLES

LIBs were produced by the standard packaging procedure and slurry coating (using graphite as an anode and $LiCoO_2$ as a cathode), followed by designated folding and cutting procedures to achieve particular kirigami patterns. Over 150% stretchability and 87 Wh/kg energy density have been achieved and the produced kirigami LIBs have been demonstrated to power a Samsung Gear 2 smart watch.

Additional LIBs were formed using the other two kirigami patterns of FIGS. 1(a) and 1(c), namely zigzag-cut patterns and cut-N-shear patterns, respectively. Very similar electrochemical and mechanical characteristics were exhibited during testing of these kirigami LIBs. The LIB using the cut-N-shear pattern (FIG. 1(c)) exhibited double the energy capacity compared with that using the cut-N-twist pattern (FIG. 1(b)) for a given length, and its stretchability was determined to be up to 150%.

Fabrication of Kirigami Lithium-Ion Batteries

The multilayer stacking structures as shown in FIG. 6 were used to fabricate the exemplary lithium-ion batteries (LIBs), where graphite (commercially available from Fisher Scientific Inc.) and $LiCoO_2$ (LCO, commercially available from MTI Corp.) were used as active materials for anode and cathode electrodes, respectively. Copper (Cu) and aluminum (Al) were used as the anode and cathode current collectors, respectively. Polypropylene (commercially available as Celgard 2500) was used as the separator, 1 M $LiPF_6$ in EC:DMC:DEC (1:1:1) as the electrolyte, and aluminized polyethylene (PE) (commercially available form Sigma-Aldrich Corp.) was the packaging material. Cathode slurries were prepared by mixing the LCO, PVDF (commercially available from MTI Corp.), Carbon black (commercially available as Super C45) and N-Methyl-2-pyrrolidone solvent (commercially available from CreoSalus, Inc.) with a ratio of 8:1:1:5 by weight. The slurry was uniformly coated on a 10 μm-thick Al foil (commercially available as Reynolds Wrap), and then dried on a hot plate at 130° C. for 5 hours in room environment. Anode slurries were prepared by mixing the graphite, carbon black (commercially available as Super C45), Carboxymethyl cellulose (commercially available from Fisher Scientific), Styrene Butadiene Rubber (commercially available from Fisher Scientific) and deionized water with a ratio of 95:2.5:1.25:1.25:200 by weight. The slurry was uniformly coated on a 20 μm-thick Cu foil (CF-T8G-UN, commercially available from Pred Materials International, Inc.), and then dried on a hot plate at 130° C. for 5 hours in room environment. A mass ratio for graphite: LCO was around 1:2.5. The anode and cathode electrodes were pressed to make condensed electrodes. The multilayer structures shown in FIG. 6 were subjected to folding and cutting following the three patterns illustrated in FIGS. 1(a)-(c).

Electrochemical Characterization

An electrochemical workstation available from Arbin Instruments, Inc. with a cutoff voltage of 2.5-4.2 V at room temperature was used to conduct cyclic galvanostatic charge and discharge of the kirigami batteries at the most compact and the stretched states. The maximum output power of the fully charged battery was calculated by $V^2/2R_i$, where V is the open circuit voltage and $R_i$ is the internal resistance as a function of system-level mechanical strain and cycles of mechanical loading. The values of voltage of the exemplary kirigami batteries were measured using a voltmeter. The electrochemical impedance spectroscopy (EIS) characterizations were performed by applying a small perturbation voltage of 5 mV in the frequency range of 0.1 Hz to 100 kHz during the first discharge cycle before and after stretching, using a Gamry Echem Analyst. The analysis of the impedance spectra was conducted using equivalent circuit software provided by the manufacturer.

Electrochemical and Mechanical Characterization of Kirigami Lithium-Ion Batteries Using Cut-N-Shear Pattern FIGS. 7(a)-(i) relate to exemplary LIBs prepared using the cut-N-shear pattern. An exemplary LIB prepared using the cut-N-shear pattern was shown to be stretchable up to 150% using the most compact state as the reference. The thickness change, from 4.30 mm at the most compact state to 2.7 mm at the most stretched state, is noticeable.

Figure 7A:
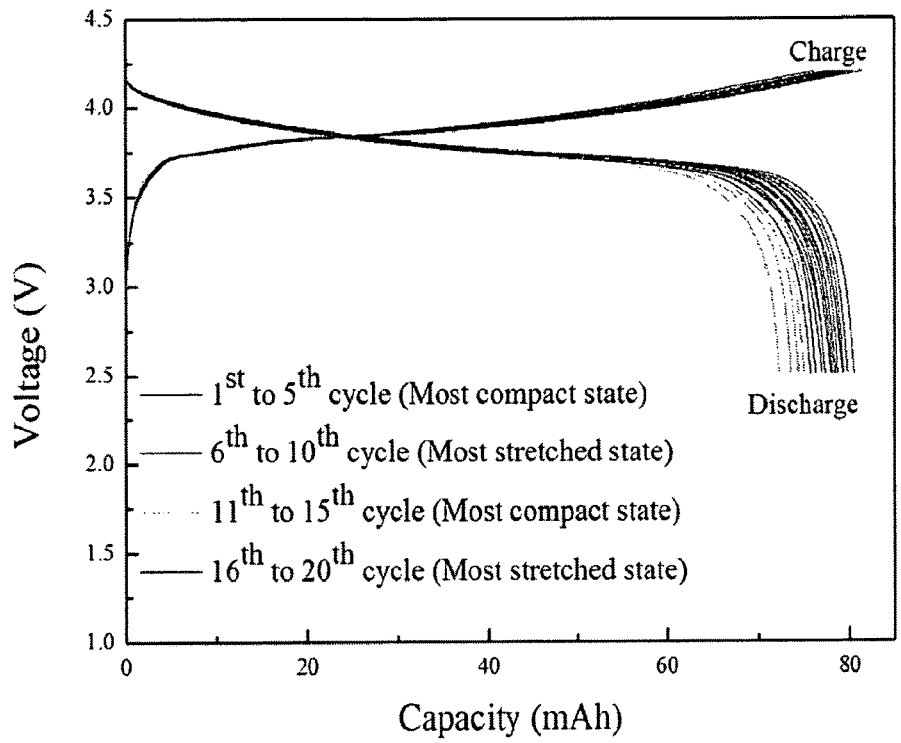
FIG. 7(a) is a graph of galvanostatic charge and discharge for a kirigami LIB prepared using a cut-N-shear pattern at various compact and stretched states under C/3 charge/discharge rate, depicting voltage as a function of capacity.

FIG. 7(a) shows the electrochemical cycling (galvanostatic charge and discharge) results of an LIB using the cut-N-shear pattern at its most compact state (for the $1^{st}$ to $5^{th}$ cycles), followed by that at its most stretched state (for the $6^{th}$ to $10^{th}$ cycles), then that at its most compact state again (for the $11^{th}$ to $15^{th}$ cycles) and finally followed by that at its most stretched state again (for the $16^{th}$ to $20^{th}$ cycles) under C/3 charge/discharge rate. Fairly stable charge/discharge behaviors under the compact and stretched states are observed. The present mass loading gives this kirigami LIB about 75 mAh energy capacity. The mass loading of $LiCoO_2$ (LCO) (specific capacity of 145 mAh $g^{-1}$) and graphite (specific capacity of 372 mAh $g^{-1}$) were 240 mg and 650 mg, respectively, which gave LIB the capacity of 75 mAh.

Figure 7B:
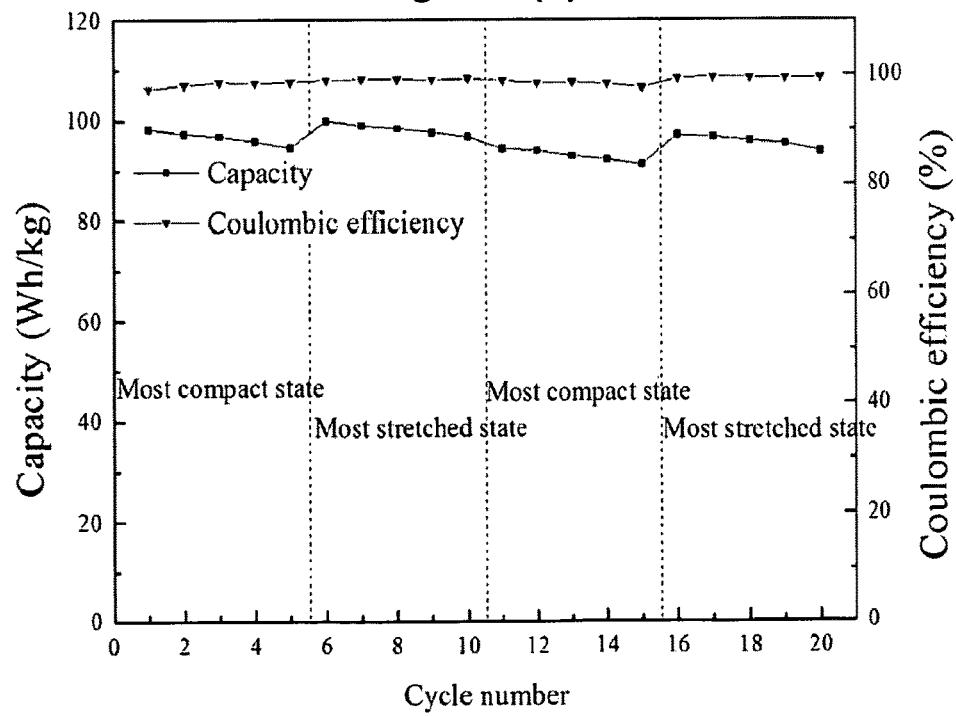
FIGS. 7(b)-(c) are graphs of capacity and Coulombic efficiency as a function of cycle number for a kirigami LIB prepared using a cut-N-shear pattern.

FIG. 7(b) shows the cyclic stability of the LIBs up to 20 cycles, illustrating capacity and Coulombic efficiency as a function of cycle number for a C/3/charge/discharge rate. The mass accounts for all the materials involved in the cell, which is 2.98 g.

Figure 7C:
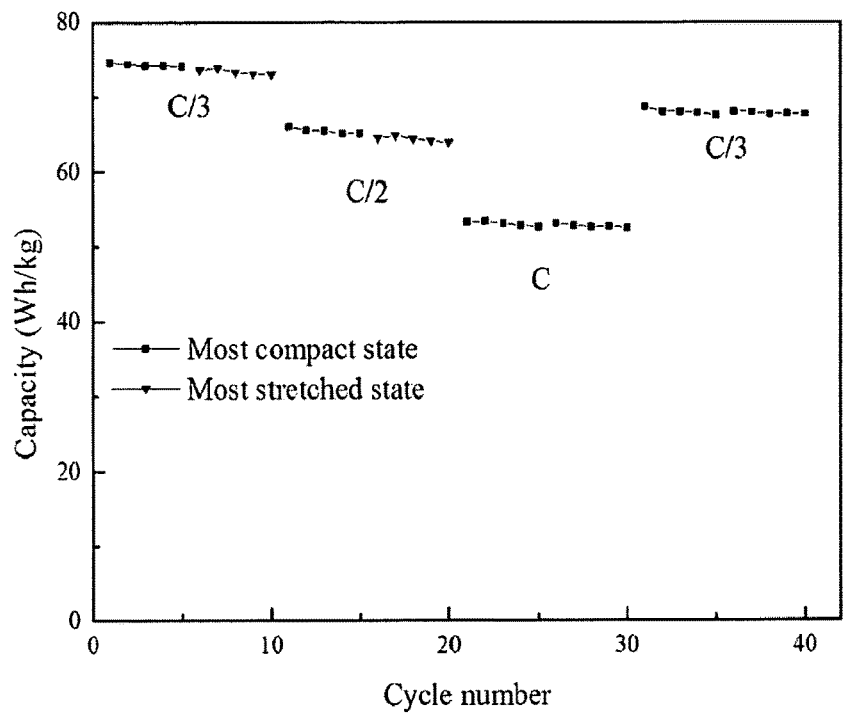

FIG. 7(c) shows the excellent rate performance of the exemplary kirigami battery when the charge/discharge rate varied in the sequence of C/3, C/2, C and C/3 again at both compact and stretched state. When discharge rates increase, as expected, the capacity decreases from 90.8 Wh/kg for C/3 rate to 82.4 Wh/kg for C/2 rate, and 70.2 Wh/kg for discharge rate C. However, the capacity recovered to the 87.8 Wh/kg when the discharge rate resumed to C/3 after 30 cycles charge/discharge at the both compact the stretched state under varies C-rates, which indicates excellent rate performance of this kirigami battery.

Figure 7D:
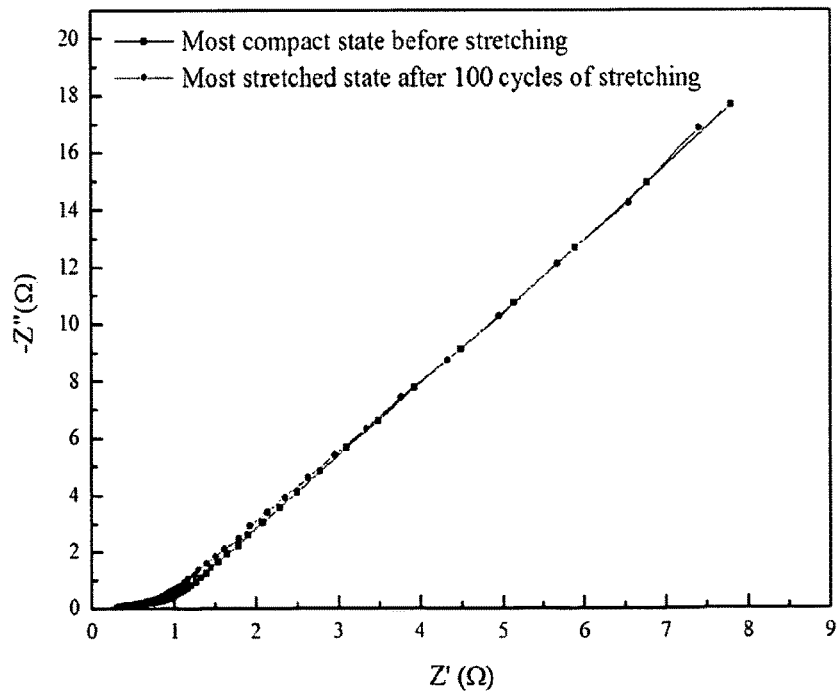
FIG. 7(d) is a graph of electrochemical impedance spectroscopy (EIS) analysis for a kirigami LIB prepared using a cut-N-shear pattern during the first discharge cycle at the most compact state before stretching and stretched state after 100 stretching cycles.

FIG. 7(d) provides the results for electrochemical impedance spectroscopy (EIS) studies during the first discharge cycle at the most compact state before the stretching and stretched states after 100 cycles of stretching. EIS studies were performed by applying a small perturbation voltage of 5 mV in the frequency range of 0.1 Hz to 100 kHz. Typical impedance spectrum, with high-to-middle frequency range flat curve and a relative straight line representing the low frequency range, was observed. No obvious semicircle was observed because of the low internal resistant. There are no significant changes in the impedance before and after mechanical deformation.

Figure 7E:
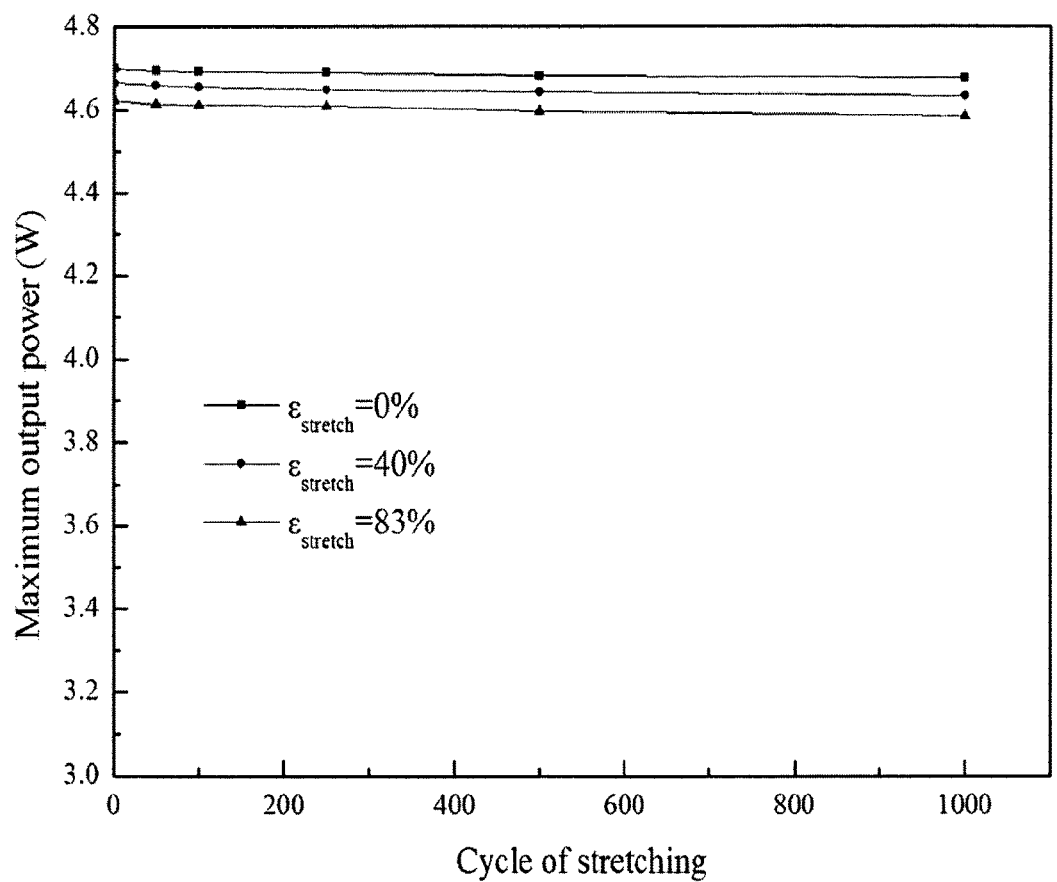
FIG. 7(e) is a graph of the maximum output power of a kirigami LIB prepared using a cut-N-shear pattern as a function of stretchability over 1,000 cycles of stretches.

The mechanical characteristics of the fully charged kirigami LIB using cut-N-shear were examined. At different stretchability levels, namely 0%, 40%, and 90%, the output voltage remained steady at 3.87 V. FIG. 7(e) shows the maximum output power of the kirigami LIB as a function of stretchability, $\varepsilon_{stretch}$, under different cycles of stretching. The internal resistance of the battery is measured to be about 1.5Ω. Over 1,000 stretching cycles and up to a stretchability $\varepsilon_{stretch}$ of 83%, there is insignificant decrease of the power. The maximum output power is 4.7 W and is sufficient to operate commercial light-emitting diodes (LEDs). LEDs driven by this kirigami LIB do not show noticeable dimming upon cyclic stretching.

Figure 7F:
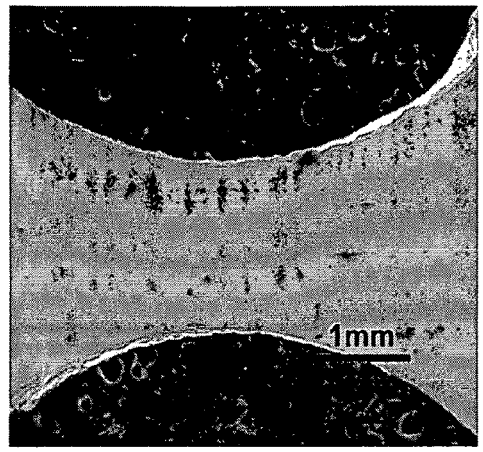
FIGS. 7(f)-(g) are SEMs of anode current collector copper at a cut before charge and after discharge and 100 cycles of stretching of a kirigami LIB prepared using a cut-N-shear pattern, respectively.
Figure 7G:
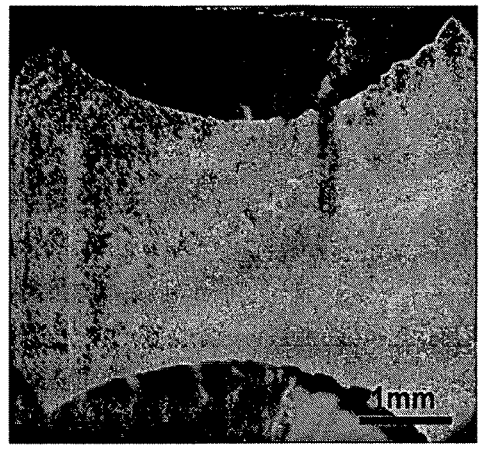
Figure 7H:
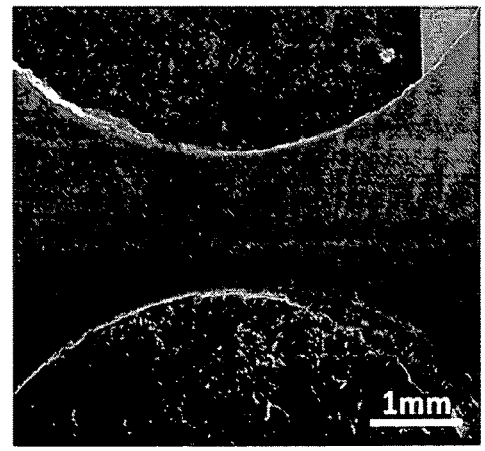
FIGS. 7(h)-(i) are SEMs of cathode current collector aluminum at a cut before charge and after discharge and 100 cycles of stretching of a kirigami LIB prepared using a cut-N-shear pattern, respectively.
Figure 7I:
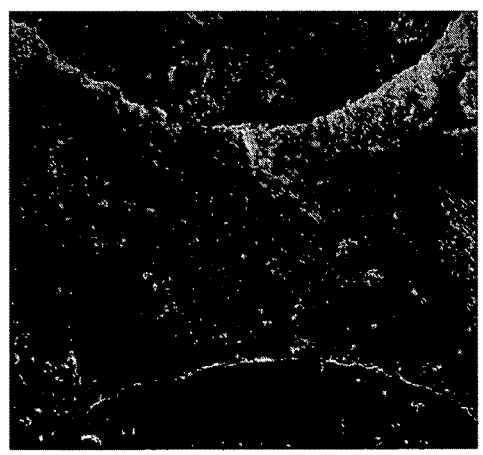

FIGS. 7(f)-(g) show the scanning electron micrographs (SEMs) for the anode current collectors (e.g., Cu foil) at the cuts before charging, and after discharge and 100 cycles of mechanical deformation. Similar SEM images are given for the cathode current collectors (e.g., Al foils) in FIGS. 7(h)-(i). There are no cracks after cyclic mechanical stretching.

Electrochemical and Mechanical Characterization of the Kirigami Lithium-Ion Batteries using Zigzag-Cut Pattern FIGS. 8(a)-(i) relate to exemplary LIBs prepared using the zigzag-cut pattern. The LIB prepared using a zigzag-cut pattern exhibited relatively small stretchability, approximately 46% measured from the most compact state to the most stretched state, and out-of-plane deformation can be observed when stretched.

Figure 8A:
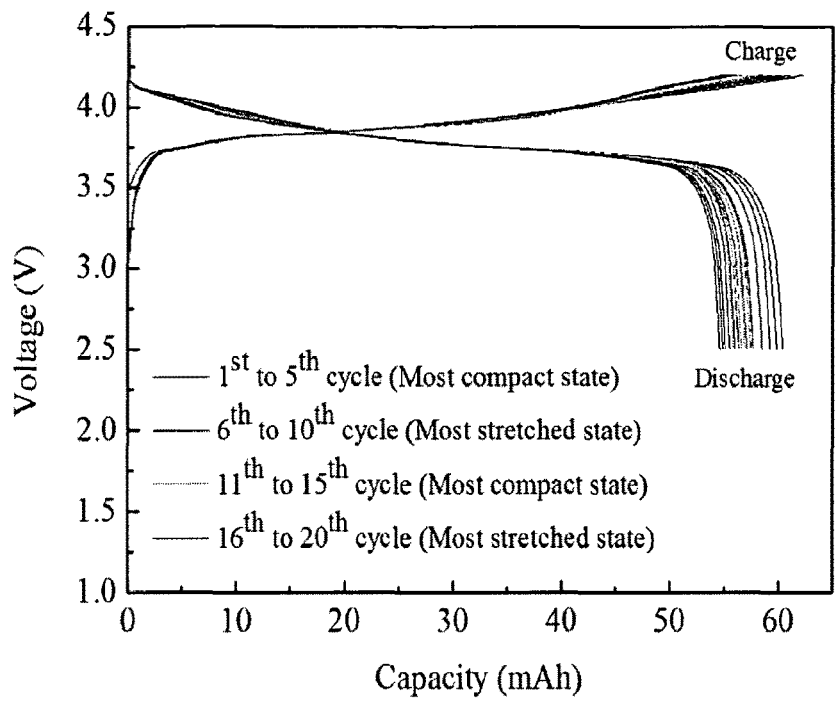
FIG. 8(a) is a graph illustrating galvanostatic charge and discharge of a kirigami LIB prepared using zigzag-cut pattern at various compact and stretched states under C/3 charge/discharge rate, depicting voltage as a function of capacity.

FIG. 8(a) shows the electrochemical cycling (galvanostatic charge and discharge) results of an LIB using the zigzag-cut pattern at its most compact state (for the 1$^{st}$ to 5$^{th}$ cycles), followed by that at its most stretched state (for the 6$^{th}$ to 10$^{th}$ cycles), then that at its most compact state again (for the 11$^{th}$ to 15$^{th}$ cycles) and finally followed by that at its most stretched state again (for the 16$^{th}$ to 20$^{th}$ cycles) under C/3 charge/discharge rate. Fairly stable charge/discharge behaviors under the compact and stretched states are observed. The present mass loading gives this kirigami LIB 55 mAh energy capacity. The mass loading of $LiCoO_2$ (LCO) (specific capacity of 145 mAh g$^{-1}$) and graphite (specific capacity of 372 mAh g$^{-1}$) were 174 mg and 457 mg, respectively, which gave LIB the capacity of 55 mAh.

Figure 8B:
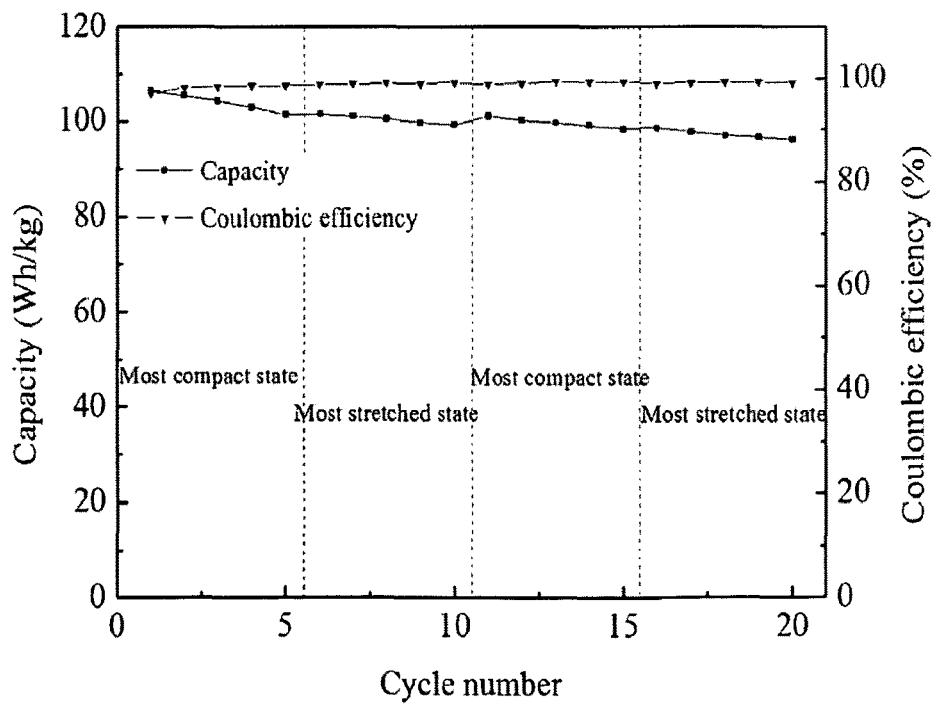
FIGS. 8(b)-(c) are graphs illustrating capacity and Coulombic efficiency as a function of cycle number for a kirigami LIB prepared using a zigzag-cut pattern.

FIG. 8(b) shows the cyclic stability of the LIBs up to 20 cycles, illustrating capacity and Coulombic efficiency as a function of cycle number for a C/3/charge/discharge rate. The mass accounts for all the materials involved in the cell, which is 2.10 g.

Figure 8C:
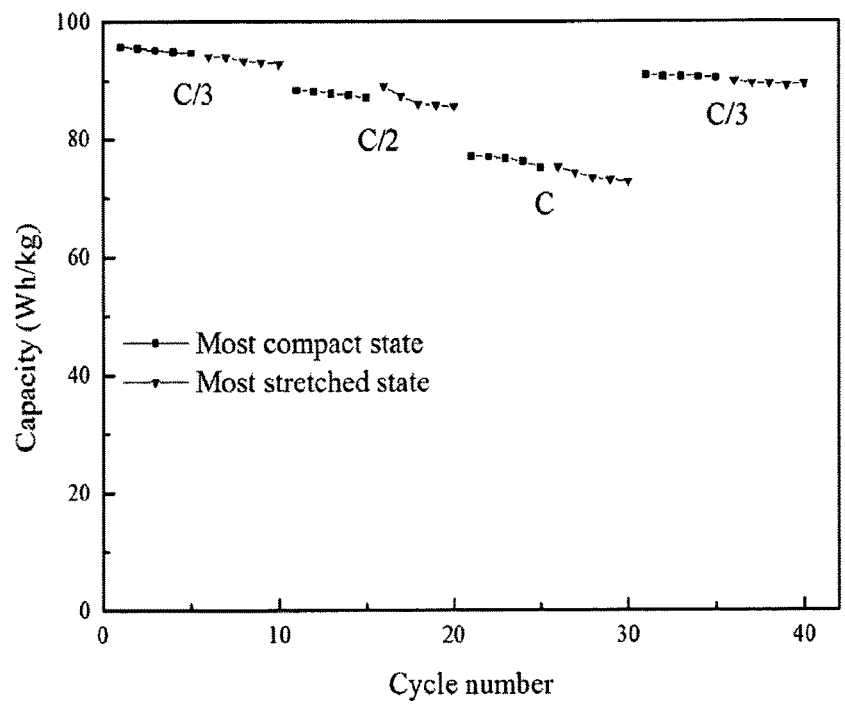

The rate performance of the exemplary kirigami battery when the charge/discharge rate varied in the sequence of C/3, C/2, C and C/3 again at both compact and stretched state is illustrated in FIG. 8(c). When discharge rates increase, as expected, the capacity decreases from 92.8 Wh/kg for C/3 rate to 88.3 Wh/kg for C/2 rate, and 77.2 Wh/kg for discharge rate C. However, the capacity recovered to the 91.0 Wh/kg when the discharge rate resumed to C/3 after 30 cycles charge/discharge at the both compact the stretched state under varies C-rates, which indicates excellent rate performance of this kirigami battery.

Figure 8D:
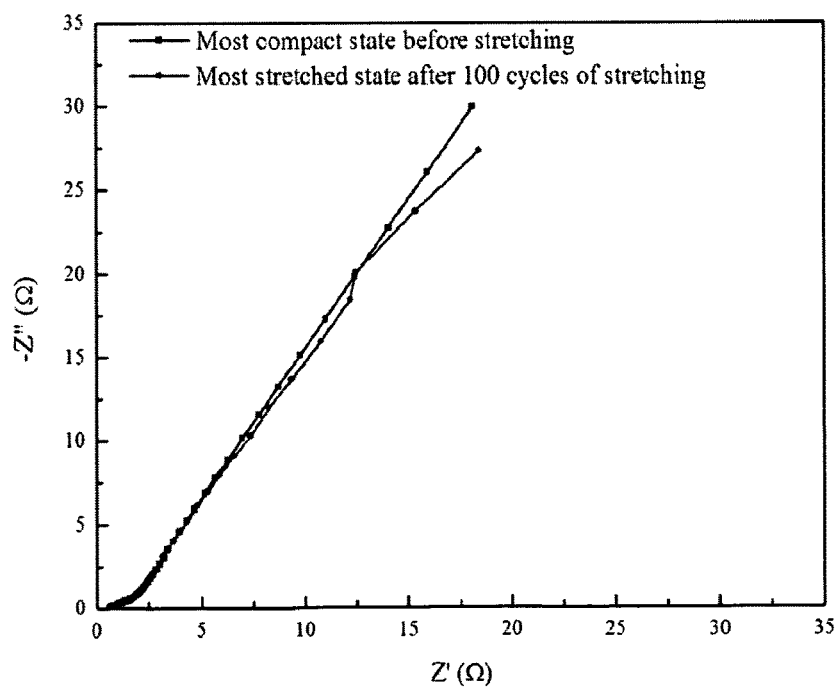
FIG. 8(d) is a graph of electrochemical impedance spectroscopy (EIS) analysis during the first discharge cycle at the most compact state before stretching and stretched state after 100 stretching cycles for a kirigami LIB prepared using a zigzag-cut pattern.

Electrochemical impedance spectroscopy (EIS) studies during the first discharge cycle at the most compact state before the stretching and stretched states after 100 cycles of stretching are shown in FIG. 8(d). EIS studies were performed by applying a small perturbation voltage of 5 mV in the frequency range of 0.1 Hz to 100 kHz. Typical impedance spectrum, with high-to-middle frequency range flat curve and a relative straight line representing the low frequency range, was observed. No obvious semicircle was observed because of the low internal resistant. There are no significant changes in the impedance before and after mechanical deformation.

Figure 8E:
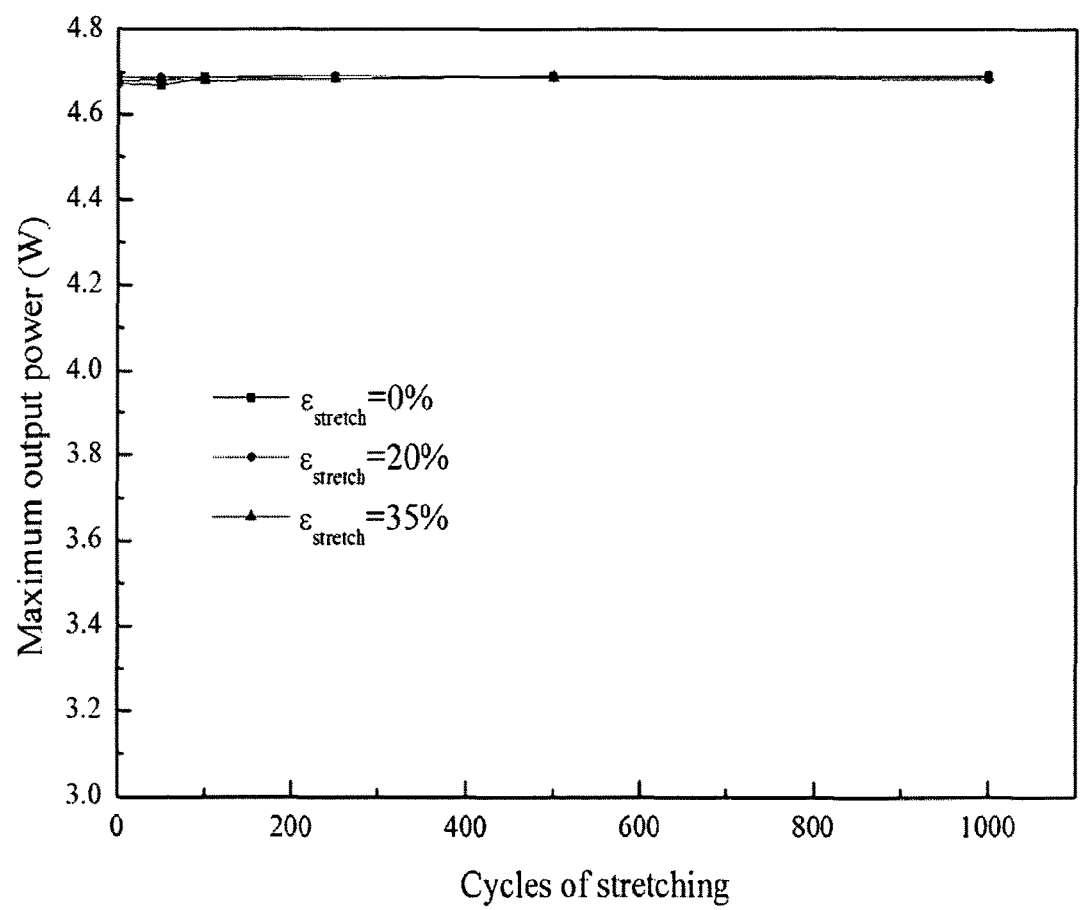
FIG. 8(e) is a graph of maximum output power for a kirigami LIB prepared using a zigzag-cut pattern as a function of stretchability over 1,000 cycles of stretching.

The mechanical characteristics of the fully charged kirigami LIB formed using the zigzag-cut were examined. At different stretchability levels, namely, 0%, 40%, and 90%, the output voltage remained steady at 3.86 V. FIG. 8(e) shows the maximum output power of the kirigami LIB as a function of stretchability, $\varepsilon_{stretch}$, under different cycles of stretching. The internal resistance of the battery is measured to be about 1.7Ω. Over 1,000 stretching cycles and up to a stretchability $\varepsilon_{stretch}$ of 35%, there is no obvious output power decay. The output power of 4.7 W is sufficient to operate commercial light-emitting diodes (LEDs). LEDs driven by this kirigami LIB do not show noticeable dimming upon cyclic stretching.

Figure 8F:
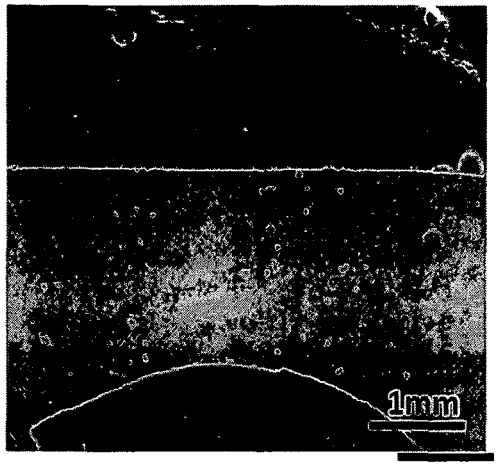
FIGS. 8(f)-(g) are SEMs of anode current collector copper at a cut before charge and after discharge and 100 cycles of stretching for a kirigami LIB prepared using a zigzag-cut pattern, respectively.
Figure 8G:
Figure 8H:
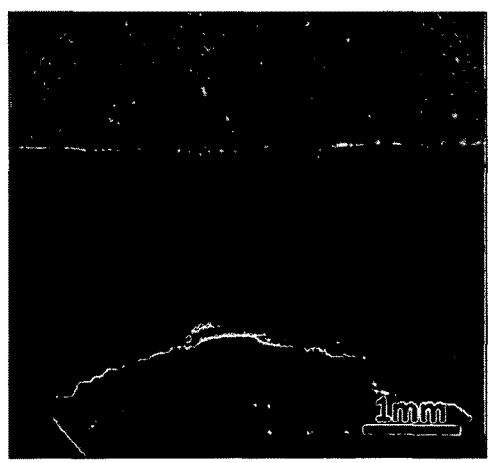
FIGS. 8(h)-(i) are SEMs of cathode current collector aluminum at a cut before charge and after discharge and 100 cycles of stretching for a kirigami LIB prepared using a zigzag-cut pattern, respectively.
Figure 8I:
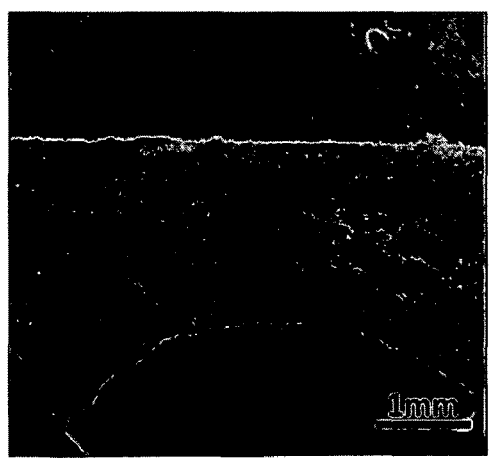

FIGS. 8(f)-(g) show the scanning electron micrographs (SEMs) for the anode current collectors (e.g., Cu foil) at the cuts before charging, and after discharge and 100 cycles mechanical deformation. Similar SEM images are given for the cathode current collectors (e.g., Al foils) in FIGS. 8(h)-(i). No cracks are observed after cyclic mechanical stretching.

Theoretical Analysis of the Two Competing Mechanisms, "Crack Growth" versus "Plastic Rolling"

According to the Griffith's criterion for linear elastic fracture, potential energy takes this form $\pi^{crack\ growth} \sim \sigma^2 \alpha^2 / E$, where σ is the normal stress on the crack, α is the size of the crack and E is the elastic modulus. The energy releasing rate due to the crack growth is then given by $J = \partial \pi^{crack\ growth} / \partial \alpha \sim \sigma^2 \alpha / E$. Here J is the J-integral which equals to the energy release per unit area. For the present scenario that has different geometrical setup as that in the Griffith's criterion, the geometry factors are taken into account. The form of J is speculated to be $A\sigma^2\alpha/E$, where A characterizes the geometrical effects and is determined by finite element simulations. A is assumed to be a function of θ.

Figure 9:
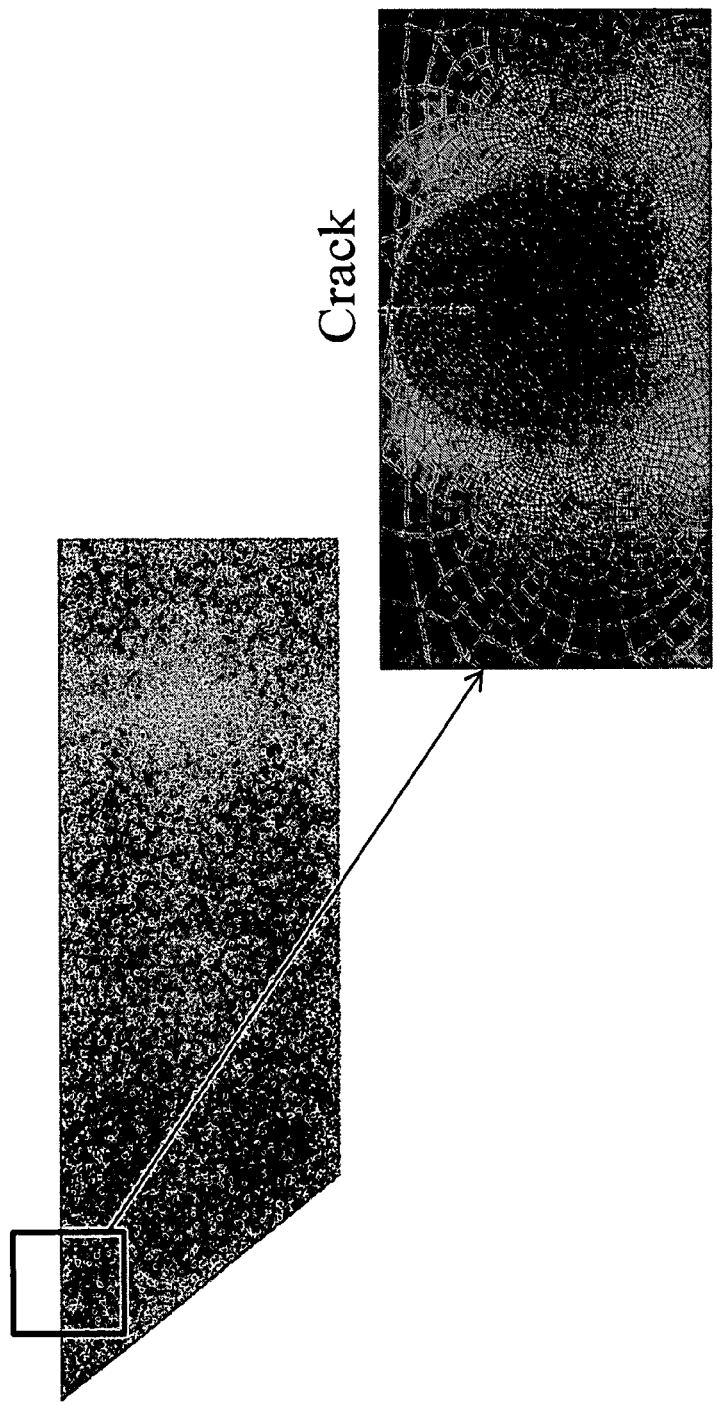
FIG. 9 is an illustration of a mesh of finite element model for θ=π/4.

In finite element simulations using commercial package ABAQUS, the values of σ, α and E are fixed while θ changes from 0 to π/3. Plane stress model was applied as the structure has very low thickness compared to its in-plane dimensions. Mesh was refined around the crack tip, which is shown in FIG. 9 for θ=π/4. About 200,000 CPS4R (4-node bilinear plane stress quadrilateral, reduced integration) elements were used to obtain accurate and converged results. J-integral was obtained by numerical integration along the elements on a circle with the crack tip as its center. After obtaining the values of J-integral for different angles θ, the value of A can be calculated by the expression of J as mentioned above, i.e. $J=A\sigma^2\alpha/E$. Substitute A into the expression of $M_{cr}^{crack\ growth}$ and the final expression of $M_{cr}^{crack\ growth}$ is thus obtained.

Figure 10:
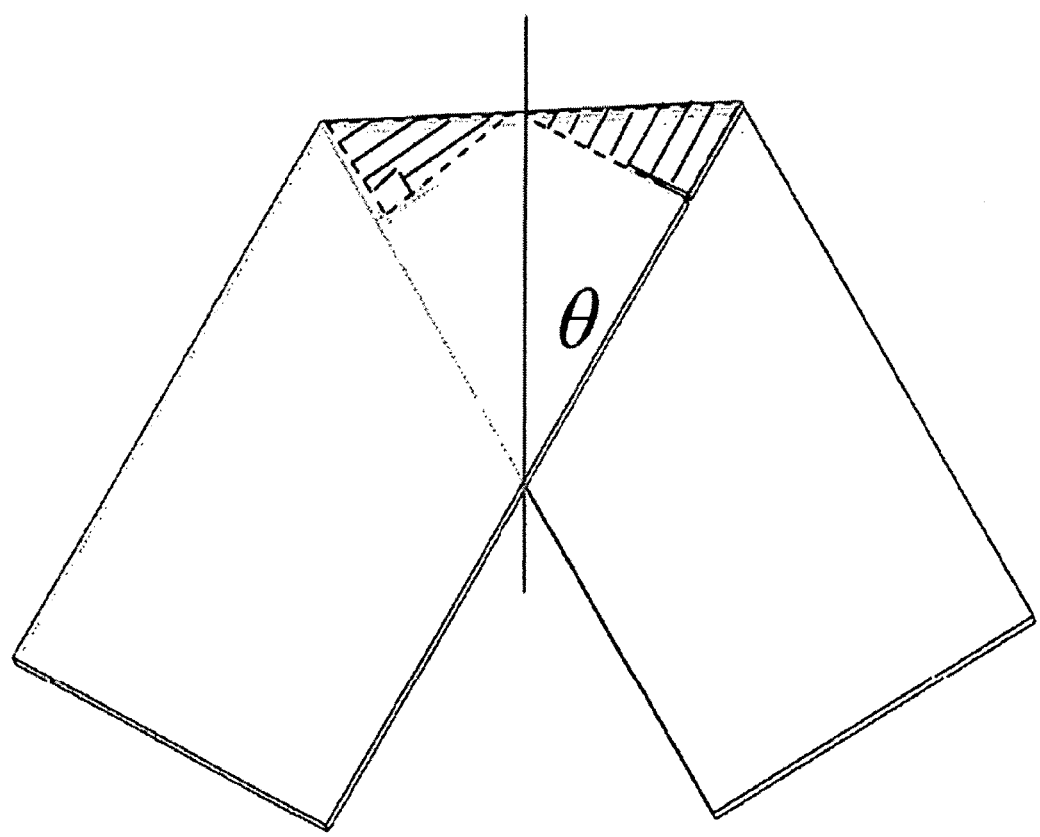
FIG. 10 is an illustration of a zone generated during "plastic rolling"

During the plastic rolling (i.e., the angle θ changes), the plastic zone is highlighted by the shaded area as shown in FIG. 10. The area of the plastic zone is $H^2 \tan \theta/4$, so the critical moment $M_{cr}^{plastic\ rolling}$ for plastic rolling can be obtained by $M_{cr}^{plastic\ rolling} = \partial \pi^{plastic\ rolling}/\partial \theta = \partial(\beta H^2 \tan \theta/4)/\partial \theta = \beta H^2(1+\tan^2 \theta)/2$.

Figure 11:
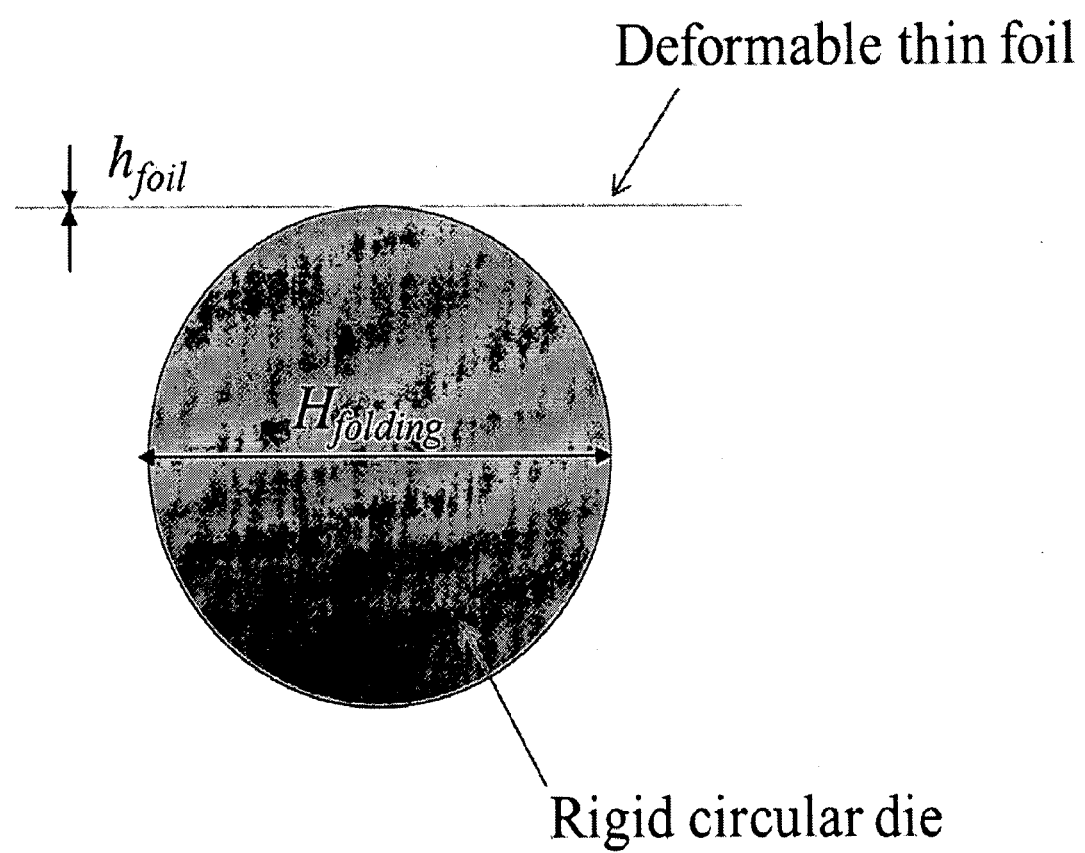
FIG. 11 is an illustration of a thin film bent around a rigid circular die.

For plastic rolling, β, the dissipated plastic energy density, was calculated by simulating folding a thin foil by a prescribed folding thickness. This problem was modeled by bending a thin film around a rigid circular die as illustrated in FIG. 11. The diameter of the rigid circular die corresponds to the folding thickness. The material parameters of Al were used in the analysis. Contact was defined between the deformable thin foil and the rigid die. 1,571 B22 (3-node quadratic beam) elements were used in the analysis. Once the thin foil enters the plastic zone, the plastic energy density was then calculated.

Figure 12:
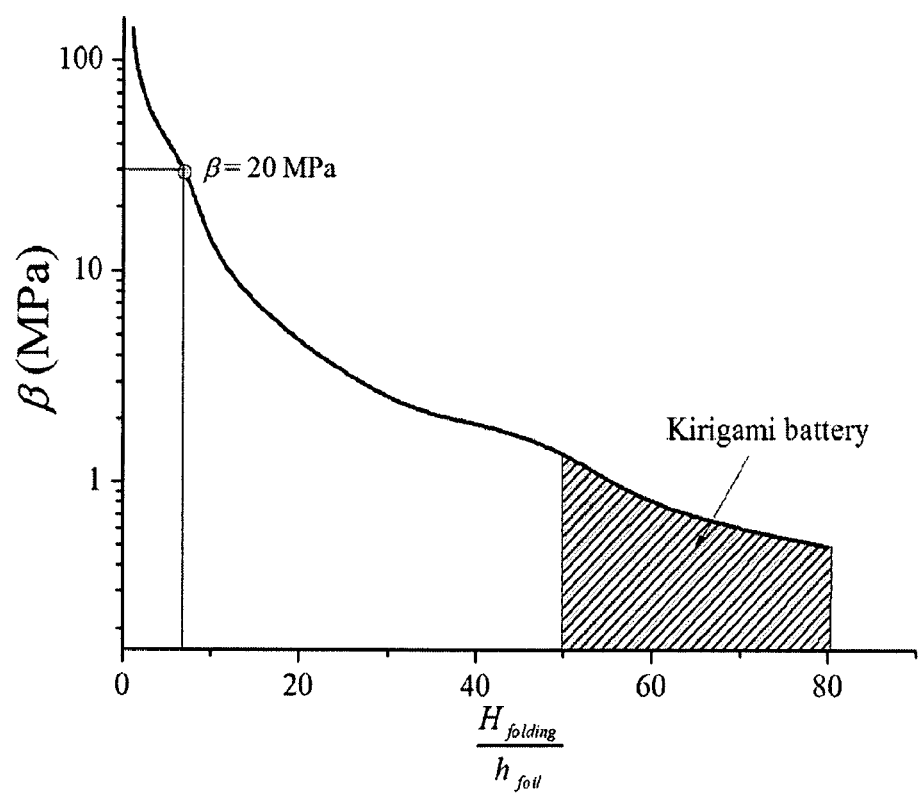
FIG. 12 is a graph illustrating the dissipated plastic energy per area (β) as a function of the extent of the folding crease that is characterized by the ratio between folding thickness and foil thickness.

FIG. 12 shows β as a function of the ratio between the folding thickness and foil thickness $H_{folding}/h_{foil}$. It is found that as the ratio $H_{folding}/h_{foil}$ increases, β decreases. For the real battery setup, Al foil is 10 μm in thickness, while the entire battery cell is 500 μm-800 μm in thickness depending on the mass loading of the active materials, which gives the ratio $H_{folding}/h_{foil}$ about 50 to 80. Within this range, FIG. 12 shows that β is on the order of 1 Mpa.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A flexible and stretchable battery comprising:
   an assembly having an anode layer and a cathode layer separated by a separator layer and sealed in a packaging,
   wherein the assembly is in a first folded configuration and contains at least one cut through the anode layer, the cathode layer, and the separator layer to form an origami-based pattern,
   wherein the assembly is configured to be unfolded and subjected to subsequent deformation, and
   wherein in a final folded state, the battery is configured to stretch beyond a flat planar state of the battery in all dimensions.

2. The flexible and stretchable battery of claim 1, wherein the cut forms a zigzag-cut pattern, a cut-N-twist pattern, a cut-N-shear pattern, a cut-N-rotation pattern, a spiral pattern, or combinations thereof, when the assembly is in a flat planar position.

3. The flexible and stretchable battery of claim 1, wherein the anode layer is formed of an anode current collector in electrical connection with an anode electrode lead and an anode electrode.

4. The flexible and stretchable battery of claim 3, wherein the anode current collector is formed of a graphite-coated copper material.

5. The flexible and stretchable battery of claim 3, wherein the anode electrode is formed of a lithium, graphite, silicide, or silicon oxide material.

6. The flexible and stretchable battery of claim 5, wherein the anode electrode is formed of lithium metal or a lithium-based alloy selected from lithium-silicon alloy, lithium-tin alloy, lithium-aluminum alloy, lithium-gallium alloy, lithium-magnesium alloy, or lithium-indium alloy.

7. The flexible and stretchable battery of claim 6, wherein the content of lithium in the lithium-based alloy is 90 to 99.9 mass %.

8. The flexible and stretchable battery of claim 1, wherein the cathode layer is formed of a cathode current collector in electrical connection with a cathode electrode lead and a cathode electrode.

9. The flexible and stretchable battery of claim 5, wherein the cathode current collector is formed of a $LiCoO_2$-coated aluminum material.

10. The flexible and stretchable battery of claim 8, wherein the cathode electrode is formed of manganese dioxide, fluorinated carbons, organic or inorganic sulfides, lithium-containing composite oxides, metal oxides or lithiated products thereof, conjugated organic polymer, Chevrel-phase compounds, olivine-type compounds, or combinations thereof.

11. The flexible and stretchable battery of claim 10, wherein the cathode electrode is formed of manganese dioxide, fluorinated carbons, sulfides, lithium-containing composite oxides, or combinations thereof.

12. The flexible and stretchable battery of claim 3, wherein the anode electrode lead contains a portion that extends outside of the packaging to function as a negative electrode terminal.

13. The flexible and stretchable battery of claim 8, wherein the cathode electrode lead contains a portion that extends outside of the packaging to function as a positive electrode terminal.

14. The flexible and stretchable battery of claim 1, wherein the packaging material is formed of laminated film having a water-vapor barrier layer and a resin layer provided on at least one surface of the water-vapor barrier layer.

15. The flexible and stretchable battery of claim 1, wherein the separator layer is formed of polypropylene, polyethylene, cellulose, polyethylene terephthalate, polyphenylene sulfide, polyamide, polyimide, and combinations thereof.

16. The flexible and stretchable battery of claim 1, wherein a stretchability of the battery is produced by utilizing rotation and/or bending of an interconnection to release stress during stretching and twisting of the battery.

17. The flexible and stretchable battery of claim 1, wherein the assembly has a flat-plate or curved-plate shape.

18. A method of making a flexible and stretchable battery, comprising the steps of:
    forming an assembly having an anode layer and a cathode layer separated by a separator layer and sealed in a packaging;
    folding the assembly; and
    cutting the assembly, wherein the assembly is configured to be unfolded and subjected to subsequent deformation, and wherein the battery, in a final folded state is configured to stretch beyond a flat planar state of the battery in all dimensions.

19. The method of claim 18, wherein the cut assembly forms a zigzag-cut pattern, a cut-N-twist pattern, a cut-N-shear pattern, a cut-N-rotation pattern, a spiral pattern, or combinations thereof, when it is in a flat planar position.

20. An electronic device comprising:
    electronics; and
    at least one flexible and stretchable battery that provides power to the electronics, the at least one flexible and stretchable battery comprising an assembly having an anode layer and a cathode layer separated by a separator layer and sealed in a packaging, wherein the assembly is in a first folded configuration and contains at least one cut through the anode layer, the cathode layer, and the separator layer to form an origami-based pattern, wherein the assembly is configured to be unfolded and subjected to subsequent deformation, and wherein the battery, in a final folded state is configured to stretch beyond a flat planar state of the battery in all dimensions.

* * * * *